United States Patent
Guo et al.

(10) Patent No.: US 11,853,730 B2
(45) Date of Patent: *Dec. 26, 2023

(54) MINI PROGRAM DATA BINDING METHOD AND APPARATUS, DEVICE, AND STORAGE MEDIUM

(71) Applicant: Tencent Technology (Shenzhen) Company Limited, Shenzhen (CN)

(72) Inventors: Peiran Guo, Shenzhen (CN); Haicheng Su, Shenzhen (CN); Yuli Cai, Shenzhen (CN); Li Liu, Shenzhen (CN); Shida Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/361,090

(22) Filed: Jun. 28, 2021

(65) Prior Publication Data

US 2021/0349700 A1 Nov. 11, 2021

Related U.S. Application Data

(63) Continuation of application No. PCT/CN2020/098553, filed on Jun. 28, 2020.

(30) Foreign Application Priority Data

Jul. 15, 2019 (CN) .......................... 201910636599.0

(51) Int. Cl.
*G06F 8/38* (2018.01)
*G06F 9/448* (2018.01)
(Continued)

(52) U.S. Cl.
CPC ............ *G06F 8/38* (2013.01); *G06F 3/04842* (2013.01); *G06F 8/34* (2013.01); *G06F 9/448* (2018.02); *G06F 9/451* (2018.02)

(58) Field of Classification Search
CPC . G06F 8/38; G06F 9/448; G06F 9/451; G06F 3/04842; G06F 8/34
See application file for complete search history.

(56) References Cited

U.S. PATENT DOCUMENTS 8,365,138 B2 * 1/2013 Iborra ....................... G06F 8/35
717/104
9,176,746 B2 * 11/2015 Kothari ................... G06F 9/451
(Continued)

FOREIGN PATENT DOCUMENTS

CN    106557314 A    4/2017
CN    108228253 A    6/2018
(Continued)

OTHER PUBLICATIONS

Gu Ma Pao Wen Le, "Others' WeChat Applet Development Took a Month to Code and Produce, But I Only Took Three Minutes", Jun. 25, 2018, 12 pgs., Retrieved from the Internet: https://www.sohu.com/a/237654005 100151340.
(Continued)

*Primary Examiner* — Jeremy L Stanley
(74) *Attorney, Agent, or Firm* — Morgan, Lewis & Bockius LLP

(57) ABSTRACT

This application discloses a mini program data binding method and apparatus, a device, and a non-transitory computer-readable storage medium. The mini program is a program executed in a host application program. The method includes: displaying a mini program production interface including a panel region and an editing region, the panel region being provided with n types of basic user interface (UI) controls, n being a positive integer; obtaining,
(Continued)

when receiving a user operation on a selected basic UI control, a program interface of the mini program in the editing region according to the selected basic UI control; obtaining a data source; and when receiving a data binding operation corresponding to a target basic UI control on the program interface of the mini program, binding the target basic UI control with the data source according to the data binding operation, the data source being used for displaying the target basic UI control.

20 Claims, 18 Drawing Sheets

(51) Int. Cl.
   *G06F 9/451*      (2018.01)
   *G06F 3/04842*    (2022.01)
   *G06F 8/34*       (2018.01)

(56)         References Cited

U.S. PATENT DOCUMENTS

| | | | | |
|---|---|---|---|---|
| 2001/0045963 | A1* | 11/2001 | Marcos | G06F 8/30 |
| | | | | 715/765 |
| 2002/0065946 | A1* | 5/2002 | Narayan | G06F 9/548 |
| | | | | 719/315 |
| 2003/0222912 | A1* | 12/2003 | Fairweather | G06F 9/4494 |
| | | | | 715/763 |
| 2005/0038796 | A1* | 2/2005 | Carlson | G06F 16/986 |
| 2005/0066287 | A1* | 3/2005 | Tattrie | G06F 9/451 |
| | | | | 715/769 |
| 2005/0172261 | A1* | 8/2005 | Yuknewicz | G06F 8/38 |
| | | | | 717/106 |
| 2005/0228801 | A1* | 10/2005 | Peters | G06F 8/38 |
| 2006/0173863 | A1* | 8/2006 | Paulus | H04L 67/02 |
| 2006/0235548 | A1* | 10/2006 | Gaudette | G06F 8/34 |
| | | | | 700/83 |
| 2007/0061740 | A1* | 3/2007 | Marini | G06F 8/38 |
| | | | | 707/999.1 |
| 2007/0094604 | A1* | 4/2007 | Sahoo | G06F 9/451 |
| | | | | 715/746 |
| 2007/0112714 | A1* | 5/2007 | Fairweather | G06K 13/0825 |
| | | | | 706/46 |
| 2007/0156740 | A1* | 7/2007 | Leland | G06F 16/2425 |
| 2007/0217580 | A1* | 9/2007 | Goose | G06F 3/016 |
| | | | | 379/88.06 |
| 2007/0256052 | A1* | 11/2007 | Xu | G06F 8/38 |
| | | | | 717/110 |
| 2008/0270919 | A1* | 10/2008 | Kulp | G06F 9/451 |
| | | | | 715/762 |
| 2009/0157627 | A1* | 6/2009 | Arthursson | G06F 9/45504 |
| 2009/0172101 | A1* | 7/2009 | Arthursson | G06F 9/452 |
| | | | | 709/205 |
| 2009/0300047 | A1* | 12/2009 | Carlson | G06F 16/00 |
| | | | | 707/999.102 |
| 2012/0290955 | A1* | 11/2012 | Quine | G06F 8/34 |
| | | | | 715/763 |
| 2013/0167050 | A1* | 6/2013 | Colletti | G06F 8/20 |
| | | | | 715/762 |
| 2014/0033053 | A1* | 1/2014 | Coloma Baiges | G06F 9/451 |
| | | | | 715/736 |
| 2014/0310273 | A1* | 10/2014 | Mital | G06F 40/18 |
| | | | | 707/736 |
| 2015/0100946 | A1* | 4/2015 | Brunswig | G06F 11/3688 |
| | | | | 717/124 |
| 2016/0378439 | A1 | 12/2016 | Straub et al. | |
| 2017/0315786 | A1 | 11/2017 | Rogers et al. | |
| 2018/0059921 | A1* | 3/2018 | De Ligt | G06F 3/04847 |
| 2018/0203674 | A1* | 7/2018 | Dayanandan | G06F 8/38 |
| 2021/0294583 | A1* | 9/2021 | Guo | G06F 8/38 |

FOREIGN PATENT DOCUMENTS

| | | |
|---|---|---|
| CN | 109218416 A | 1/2019 |
| CN | 109542543 A | 3/2019 |
| JP | 2002163251 A | 6/2002 |
| JP | 2005038404 A | 2/2005 |
| JP | 2005301994 A | 10/2005 |
| JP | 2006526192 A | 11/2006 |
| JP | 2015005241 A | 1/2015 |

OTHER PUBLICATIONS

Tencent Technology, ISR, PCT/CN2020/098553, Sep. 30, 2020, 3 pgs.
Tencent Technology, WO, PCT/CN2020/098553, Sep. 30, 2020, 4 pgs.
Tencent Technology, IPRP, PCT/CN2020/098553, Jan. 18, 2022, 5 pgs.
Extended European Search Report, EP20841164.5, dated Jul. 29, 2022, 9 pgs.
Tencent Technology, JP Office Action, Japanese Patent Application No. 2021-547516, dated Aug. 1, 2022, 8 pgs.

* cited by examiner (a)

(b)

MINI PROGRAM DATA BINDING METHOD AND APPARATUS, DEVICE, AND STORAGE MEDIUM

CROSS-REFERENCE TO RELATED APPLICATIONS

This application is a continuation application of PCT Patent Application No. PCT/CN2020/098553, entitled "DATA BINDING METHOD, APPARATUS, AND DEVICE OF MINI PROGRAM, AND STORAGE MEDIUM" filed on Jun. 28, 2020, which claims priority to Chinese Patent Application No. 201910636599.0, entitled "MINI PROGRAM DATA BINDING METHOD AND APPARATUS, DEVICE, AND STORAGE MEDIUM" and filed on Jul. 15, 2019, all of which are incorporated herein by reference in their entirety.

FIELD OF THE TECHNOLOGY

This application relates to the field of visualization programing, and in particular, to a mini program data binding method and apparatus, a device, and a storage medium.

BACKGROUND OF THE DISCLOSURE

A mini program is a program executed in a host application program, and a user may experience services brought by different mini programs by adding various mini programs to an installed host application program.

Various mini programs may be developed by companies, service agencies, or even personal users (for example, programmers) and submitted to an application provider to provide different services for users. The application provider provides a host application program as a program platform. The mini program implements various functions through a large quantity of data. A developer binds a mini program and corresponding data separately, and therefore, a user can see different content (such as text and images) on a program interface of the mini program, and implement a function such as a page jumping function by triggering a specific page.

Based on the foregoing situations, when developing a mini program, the developer needs to use professional developer tools and write a large quantity of code to implement data binding. Therefore, the mini program developing requires the developer to have more professional program compilation ability and is difficult to be promoted to more ordinary personal users to use.

SUMMARY

Embodiments of this application provide a mini program data binding method and apparatus, a device, and a storage medium, and therefore, a user may implement a function of editing or modifying displayed content in a target basic UI control by changing a data source bound with the target basic UI control, or unbinding a binding relationship between the target basic UI control and the data source, without writing code, thereby improving efficiency of a user for producing a mini program. The technical solutions are as follows:

According to an aspect of this application, a mini program data binding method is performed at a terminal, the mini program being a program executed in a host application program, and the method including:

displaying a mini program production interface of a visualization production program including a panel region and an editing region, the panel region being provided with n types of basic user interface (UI) controls, n being a positive integer;

obtaining, when receiving a user operation on a selected basic UI control, a program interface of the mini program in the editing region according to the selected basic UI control;

obtaining a data source;

binding, when receiving a data binding operation corresponding to a target basic UI control on the program interface of the mini program, the target basic UI control with the data source according to the data binding operation, the data source being used for displaying the target basic UI control; and in response to receiving a preview operation, transmitting a program package of the mini program to the host application program for running and/or previewing.

According to another aspect of this application, a mini program data binding apparatus is provided, the mini program being a program executed in a host application program, and the apparatus including:

a display module, configured to display a mini program production interface of a visualization production program including a panel region and an editing region, the panel region being provided with n types of basic UI controls, n being a positive integer;

a receiving module, configured to obtain, when receiving a user operation on a selected basic UI control, a program interface of the mini program in the editing region according to the selected basic UI control; and an obtaining module, configured to obtain a data source, the receiving module being further configured to bind, when receiving a data binding operation corresponding to a target basic UI control on the program interface of the mini program, the target basic UI control with the data source according to the data binding operation, the data source being used for displaying the target basic UI control.

According to another aspect of this application, a computer device is provided, including a processor and a memory, the memory storing at least one instruction, the at least one program being loaded and executed by the processor to implement the mini program data binding method according to the foregoing aspect.

According to another aspect of this application, a non-transitory computer-readable storage medium is provided, storing at least one instruction, the at least one instruction being loaded and executed by a processor of a computer device to implement the mini program data binding method according to the foregoing aspect.

According to another aspect of this application, a computer program product or a computer program is provided, including computer instructions, the computer instructions being stored in a computer-readable storage medium. A processor of a computer device reads the computer instructions from the computer-readable storage medium, and executes the computer instructions, so that the computer device performs the mini program data binding method provided in illustrative implementations of the foregoing aspect.

The technical solutions provided in the embodiments of this application achieve at least the following beneficial effects:

An operation is performed on a mini program production interface of a visualization production program, a target basic UI control of the mini program is bound with a data source, and the target basic UI control undergone binding can display content corresponding to the data source. Therefore, a user may implement a function of editing or modifying displayed content in the target basic UI control by changing the data source bound with the target basic UI control, or unbinding a binding relationship between the target basic UI control and the data source, without writing code, thereby improving efficiency of a user for producing a mini program.

DESCRIPTION OF EMBODIMENTS

Figure 1:
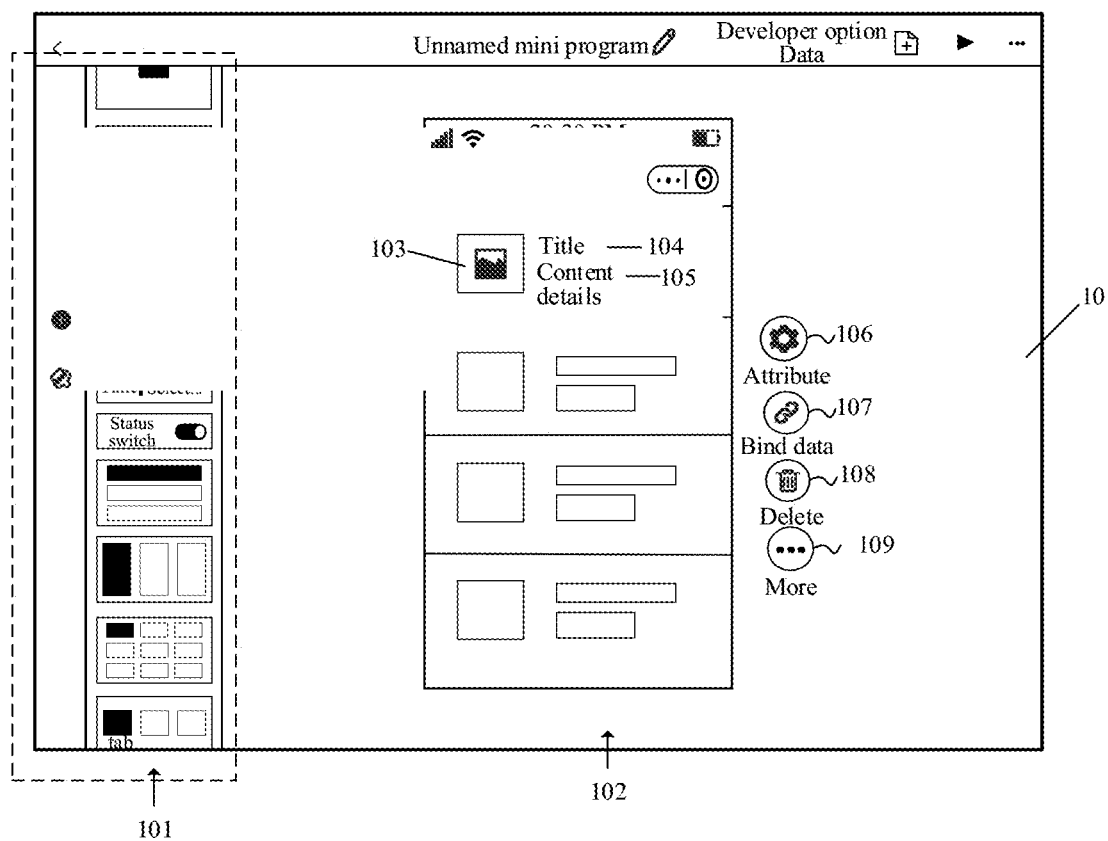
FIG. 1 is a schematic diagram of a mini program production interface of a visualization production program according to an exemplary embodiment of this application.

First, terms involved in embodiments of this application are introduced:

Visualization production program is a program that shows a program production process in a visualization preview manner to assist production. In some embodiments, the visualization production program may be a program programing through code and generating preview content in an editing region according to a code input, or may be a program automatically generating code data by directly adding interface content to the editing region and then editing the interface content. In this embodiment of this application, an example in which the visualization production program is a program automatically generating code data by adding interface content in the editing region and editing the interface content is used for description.

In some embodiments, the visualization production program may be a program producing a mini program, or may be a program producing an ordinary program. In this embodiment of this application, an example in which the visualization production program produces a mini program is used for description.

Basic user interface (UI) controls are any visible controls or elements that can be seen on a UI of an application, for example, controls such as an image, an input box, a text box, a button, and a label. Some UI controls respond to operations of a user. For example, the user can enter text in the input box, and the user performs information interaction with the UI by using the foregoing UI controls.

Data is content on a page, for example, images, text, videos, audios, animations are all data. The data may be static or dynamic. The static data is data written into a program during programing, and the dynamic data is data obtained through a network protocol in a running process of the program. The network protocol refers to a set of rules, standards or agreements established for data exchange in a computer network. In the network, characters used by terminals are different, and therefore, a command entered by a user at a terminal cannot be recognized at another terminal. For an ordinary communication, the network protocol stipulates that each terminal needs to convert respective characters into standard characters before inputting the characters to a network for transmission, and then convert, after the standard characters reach a target terminal, the standard characters into characters used by the target terminal. In some embodiments, the network protocol is a transmission control protocol/internet protocol (TCP/IP).

View layer is a development document of a mini program. When a mini program is run on a host application program, a development document of the mini program is rendered into a page on a screen, and static data may be directly written into the development document of the mini program.

Logic layer is a file (a JavaScript file, also referred to as a JS file) written in an interpreted scripting language, is applicable to a mini program, and includes a dynamic logic of the mini program, for example, responding to a user click event and transmitting a request to obtain data. The logic layer modifies views through data binding.

Data binding is to bind data with a corresponding UI control to generate an interface of a mini program. Dynamic data of the view layer needs to be provided by the logic layer. When writing a program corresponding to the view layer, the view layer and the logic layer are ensured to be in one-to-one correspondence with each other by reserving a position for the dynamic data.

Data field means that each piece of data may include a plurality of data fields. For example, a piece of student information data includes "student number", "name", "gender", "age", "score", and other data fields.

Data element format is used for describing a format and type of data. For example, a class information table may be presented by using a list formed by data forming a "class", each item of the list includes three data fields, namely, "name", "age", and "gender".

For example, an example in which the visualization production program produces a mini program is used for description in this application. The method provided in this application may be applied to the following scenario: An ordinary user with no program compilation knowledge binds basic UI controls with data sources by using a panel region and an editing region on a mini program production interface, to further complete the production of the mini program. Alternatively, a professional developer with program compilation knowledge binds basic UI controls with data sources in a visualization manner by using a mini program production interface and does not need to write a large quantity of code, thereby improving the efficiency of the professional developer to develop a mini program. In addition, code can also be generated by using the mini program interface of the visualization production program, thereby facilitating check by the professional from a perspective of code.

The method provided in this application may be applied to a visualization production program or a program having a visualization production program function. An example in which the method is applied to a visualization production program is used in the following embodiment for description.

FIG. 1 is a schematic diagram of an interface of binding data of a visualization production program according to an exemplary embodiment of this application. A panel region 101, an editing region 102, an image control component 103, a title control component 104, a content control component 105, an attribute option 106, a data binding option 107, a delete option 108, and a more option 109 are displayed on a mini program production interface 10.

In some embodiments, the panel region 101 is provided with n types of basic UI controls, n being a positive integer. In some embodiments, the basic UI controls include at least one of the image control component 103, text control components (such as the title control component 104 and the content control component 105), a video control component, an audio control component, and an animation control component. A list or frame of the mini program is displayed in the editing region 102, and data needs to be added to the list. In some embodiments, the data is at least one of images, text, videos, audios, and animation. That is, a binding operation is performed on a corresponding basic UI control and corresponding data, and therefore an interface after the mini program is produced is generated. In some embodiments, the attribute option 106 is used for viewing an attribute of a target basic UI control, or viewing an attribute of a data source bound with the target basic UI control. The attribute refers to parameters related to the target basic UI control or the data source bound with the target basic UI control, includes but not limited to: a name, quantity, size, shape (such as zooming, stretching, cutting), transparency, filter (parameters used for changing a hue of an image or a video frame), and sticker (referring to elements superimposed on an image or a video frame). The data binding option 107 is used for performing a binding operation on the target basic UI control and the data source. The delete option 108 is used for unbinding the bound target basic UI control and data source, or deleting a basic UI control from the mini program. The more option 109 is used for viewing other functions of the mini program production interface, or used for viewing other forms of a list corresponding to the mini program, or used for sharing the mini program interface. This is not limited in this application. A user binds a target basic UI control with a data source by using the data binding option 107. For example, the user binds the image control component 103 with a corresponding image data source. The image control component 103 and the corresponding image data source may be bound by selecting the image control component 103, obtaining a corresponding image data source, and selecting the data binding option 107.

Figure 2:
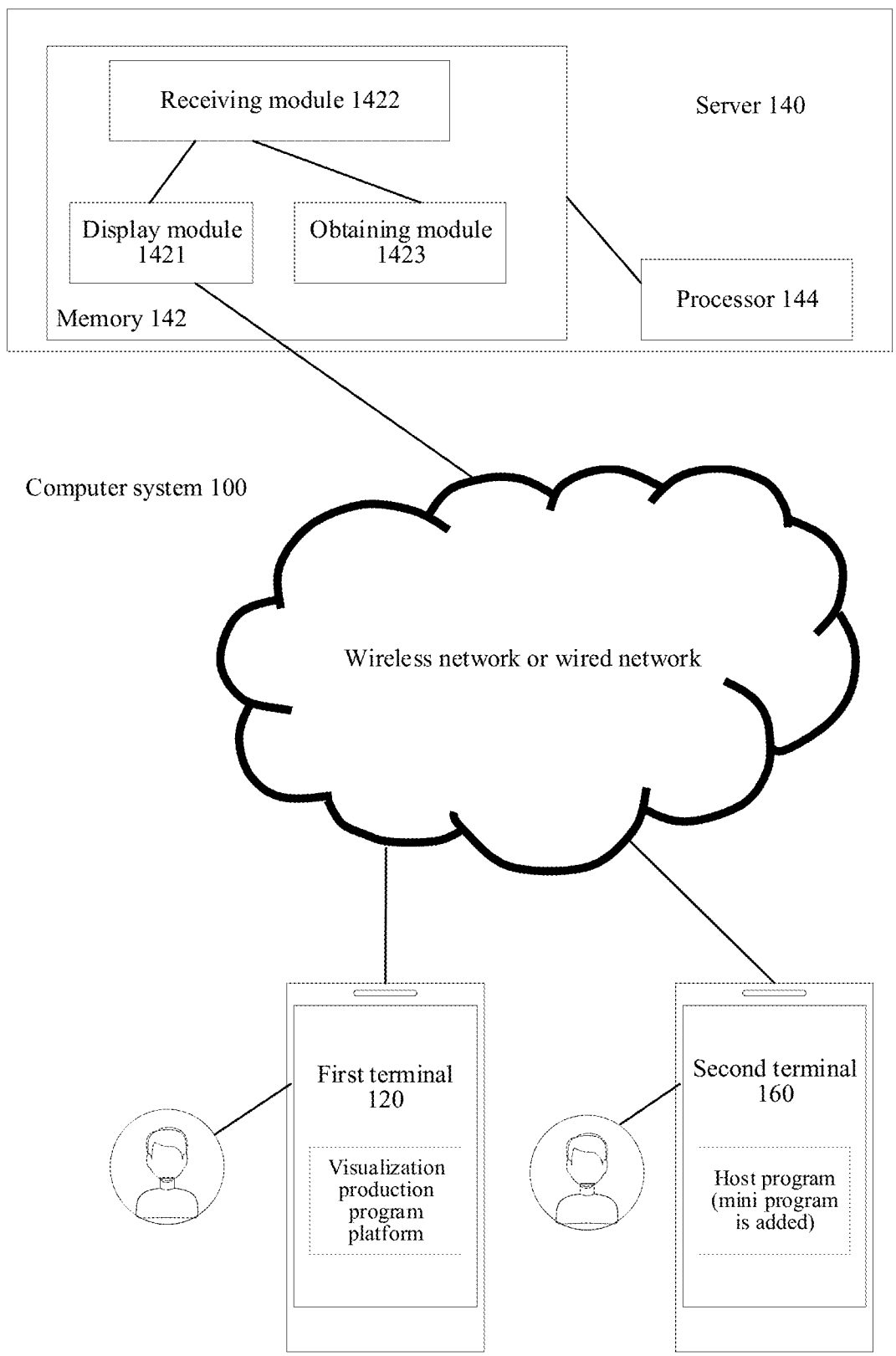
FIG. 2 is a block diagram of an implementation environment according to an exemplary embodiment of this application.

FIG. 2 is a structural block diagram of a computer system according to an exemplary embodiment of this application. A computer system 100 includes a first terminal 120, a server 140, and a second terminal 160.

A visualization production program platform or a platform supporting a visualization production program is installed or run on the first terminal 120. The first terminal 120 is a terminal used by a first user, and the first user uses the visualization production program platform on the first terminal 120 to produce a program or a mini program. For example, the first user uses the visualization production program platform on the first terminal 120 to produce a mini program by binding a target basic UI control with a corresponding data source.

The first terminal 120 is connected to the server 140 via a wireless network or a wired network.

The server 140 includes at least one of one server, a plurality of servers, a cloud computing platform, and a virtualization center. For example, the server 140 includes a processor 144 and a memory 142. The memory 142 further includes a display module 1421, a receiving module 1422, and an obtaining module 1423. The server 140 is configured to provide a backend service for the visualization production program, for example, provide a storage service and an updating service of a data source corresponding to a program or a mini program. In some embodiments, the server 140 is responsible for primary computing work, and the first terminal 120 and the second terminal 160 are responsible for secondary computing work; or the server 140 is responsible for secondary computing work, and the first terminal 120 and the second terminal 160 are responsible for primary computing work; or the server 140, the first terminal 120, and the second terminal 160 perform collaborative computing by using a distributed computing architecture among each other.

A host application program is installed and run on the second terminal 160, and a mini program published by the first terminal 120 is added to the host application program, the second terminal 160 being a terminal used by a second user. In some embodiments, the second user logs into or registers an account on the mini program to implement an operation of accessing the mini program. In some embodiments, a visualization production program platform may be also installed or run on the second terminal 160. A host application program may be also installed and run on the first terminal 120, and a mini program published by the second terminal 160 or another terminal is added to the host application program. The first user logs into or registers an account on the mini program to implement an operation of accessing the mini program.

In some embodiments, the visualization production program platforms installed on the first terminal 120 and the second terminal 160 are the same, or the visualization production program platforms installed on the two terminals are the same type of visualization production program platforms in different control systems. The first terminal 120 may be generally one of a plurality of terminals, and the second terminal 160 may be generally one of a plurality of terminals. In this embodiment, only the first terminal 120 and the second terminal 160 are used as an example for description. Device types of the first terminal 120 and the second terminal 160 are the same or different. The device type includes at least one of a smartphone, a tablet computer, an ebook reader, a moving picture experts group audio layer III (MP3) player, a moving picture experts group audio layer IV (MP4) player, a laptop computer, and a desktop computer. The following embodiment is described by using an example that the terminal includes a tablet computer and a smartphone.

A person skilled in the art may learn that there may be more or fewer terminals. For example, there may be only one terminal, or there may be dozens of or hundreds of terminals or more. The quantity and the device type of the terminals are not limited in the embodiments of this application.

Figure 3:
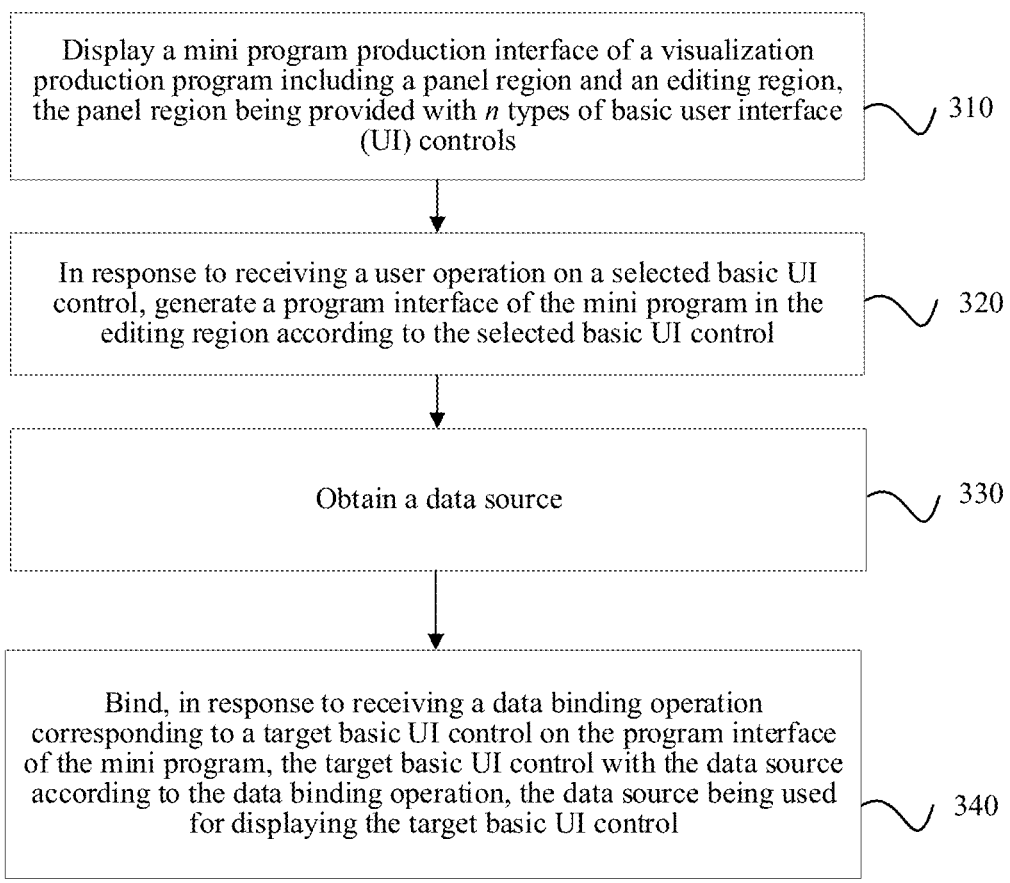
FIG. 3 is a flowchart of a mini program data binding method according to an exemplary embodiment of this application.

FIG. 3 shows a mini program data binding method according to an exemplary embodiment of this application. The method is applied to the first terminal 120 or the second terminal 160 in the computer system shown in FIG. 2 or another terminal in the computer system. The method includes the following steps:

Step 310. Display a mini program production interface of a visualization production program, a panel region and an editing region being displayed on the mini program production interface, the panel region being provided with n types of basic UI controls.

In some embodiments, a mini program production interface of the visualization production program is displayed on a terminal, and the terminal is a smartphone, a tablet computer, a notebook computer, or a desktop computer. For example, a mini program production interface of the visualization production program is displayed on a tablet computer, and a user performs an editing operation on the mini program by using an editing operation on a display screen of the tablet computer. In some embodiments, the editing operation is at least one of a tap operation, a double-tap operation, a drag operation, a slide operation, and a long press operation. This is not limited in this application.

Figure 4:
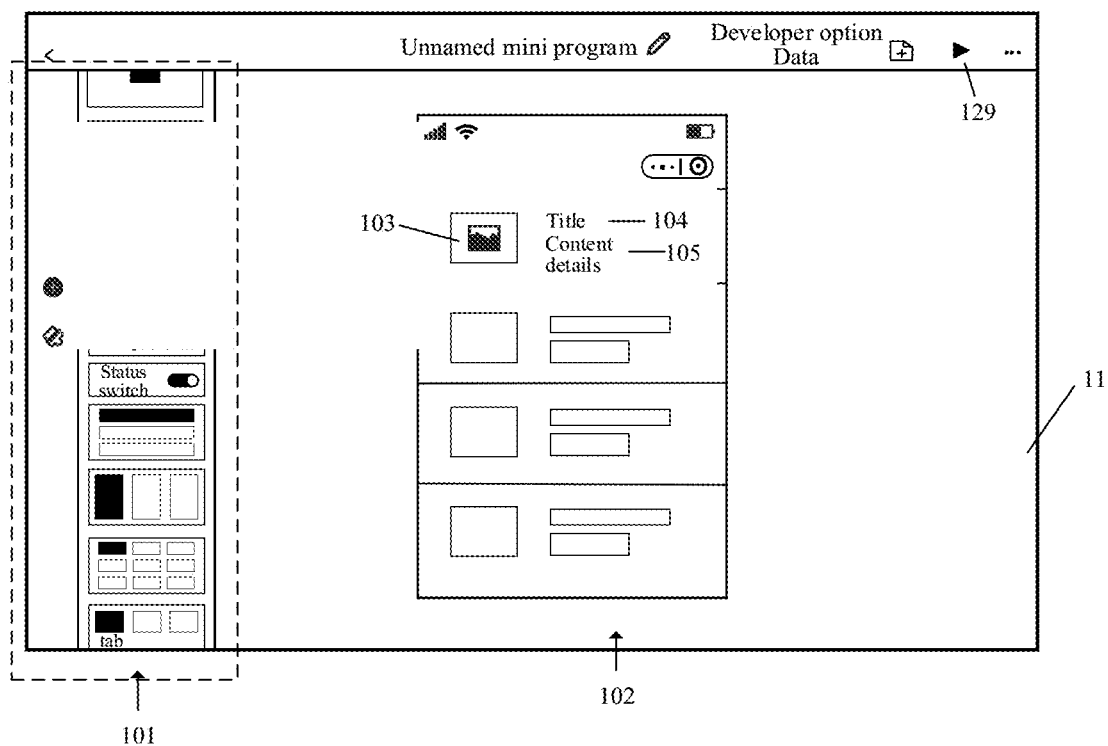
FIG. 4 is a schematic diagram of a mini program production interface of a visualization production program according to another exemplary embodiment of this application.

An example in which a panel region and an editing region are displayed on the mini program production interface is described with reference to FIG. 4. FIG. 4 is a schematic diagram of a mini program production interface of a visualization production program according to an exemplary embodiment of this application. A panel region 101 and an editing region 102 are displayed on a mini program production interface 11. In some embodiments, the panel region 101 is located at a left side of the mini program production interface 11. In some embodiments, the panel region 101 is located at a right side, an upper side, or a lower side of the mini program production interface 11. A position of the panel region 101 in the mini program production interface is not limited in this application.

In some embodiments, the panel region 101 is provided with n types of basic UI controls, n being a positive integer. For example, if n is 3, there are three basic UI controls provided on the panel region 101. For example, the basic UI controls include: input boxes (including a single line input box and a multi-line input box), an option (such as a virtual button or a check box), time, a dynamic switch (supporting a jumping between pages), a page layout, and the like.

In some embodiments, the user may name the produced mini program, name the mini program before producing the mini program, or name the mini program after the mini program is produced, or name the mini program at any time during producing the mini program. In some embodiments, a name of the mini program is located at an upper side of the mini program production interface, and the mini program is named by using an editing button (optionally, an editing button in a "pen" shape). In some embodiments, the name of the mini program is located at a right side of the mini program. This is not limited in this application.

In some embodiments, a preview control 129 is displayed on the mini program production interface 11. The user transmits, by selecting the preview control 129, a program package of the mini program to a host application program platform for auditing or publishing.

Step 320. In response to receiving a user operation on a selected basic UI control, generate a program interface of the mini program in the editing region according to the selected basic UI control.

As shown in FIG. 1, the terminal obtains, in response to receiving a user operation on a selected basic UI control, a program interface of the mini program in the editing region 102 according to the selected basic UI control. In some embodiments, the selected basic UI control includes an image control component 103, a title control component 104, and a content control component 105. In some embodiments, the selected basic UI control may be a video control component, an audio control component, or an animation control component. For example, the program interface of the mini program is obtained after typesetting or layout editing is performed on the foregoing selected basic UI control.

In some embodiments, when producing a mini program on a mini program production interface of a visualization production program, the user may add a list item template by selecting a list item template provided by a visualization program platform, customizing a list item template, or calling another program (that can generate a list item template or provide a list item template) or a file including a list item template. The list item is a structure that can hold data in a mini program interface, for example, a list structure of an address book in a communication program. In some embodiments, the user may add a list item template by using a tap operation, a double-tap operation, a drag operation, a slide operation, or a long press operation.

Step 330. Obtain a data source.

In some embodiments, the user may obtain the data source by using at least one of the following manners.

Manner 1. Display a first table file on the mini program interface of the visualization production program and receive an addition operation of the user, the addition operation being used for adding the first table file to the visualization production program. In some embodiments, the addition operation is a tap operation, a double-tap operation, a drag operation, a slide operation, or a long press operation.

For example, the data source is obtained by dragging the first table file. A file with a table file name being A is dragged to the mini program production interface, and the mini program production interface automatically recognizes a data source in the table file, and adds the data source to the mini program production interface, for example, adds a data source corresponding to an image to a data table or a data option.

Manner 2. Receive a program calling operation, the program calling operation being used for calling a table application in the visualization production program, and the table application including a second table file.

For example, the data source is obtained by calling a table application. For example, there is a calling option in the mini program production interface, and the table application (such as an Excel) is opened by using the calling option. The mini program performs a data source recognition operation on a file B (a file name of the second table file is B) in the table application, and adds the data source to the data table or the data option in the mini program production interface.

Manner 3. Receive a third table file by using a short range wireless communication technology.

For example, the terminal receives the third table file by using the short range wireless communication technology. In some embodiments, the short range wireless communication technology is a Bluetooth technology, a Zigbee technology, an Airdrop technology, or the like. The received table file is opened at a platform of the visualization production program, and the data source in the table file is added to the data table or the data option in the mini program production interface. In some embodiments, the third table file may be alternatively transmitted to the visualization production program platform by another application, for example, a social application, a mail application, an instant messaging application, or the like.

In some embodiments, the user may select one specific piece of data from the data table, or select all data from the data table. In some embodiments, the user may drag the data table to a corresponding position (that is, in the list item) in the mini program production interface by using a tap operation, a double-tap operation, a drag operation, a slide operation, or a long press operation.

Step 340. Bind, in response to receiving a data binding operation corresponding to a target basic UI control on the program interface of the mini program, the target basic UI control with the data source, the data source being used for displaying the target basic UI control.

Figure 5:
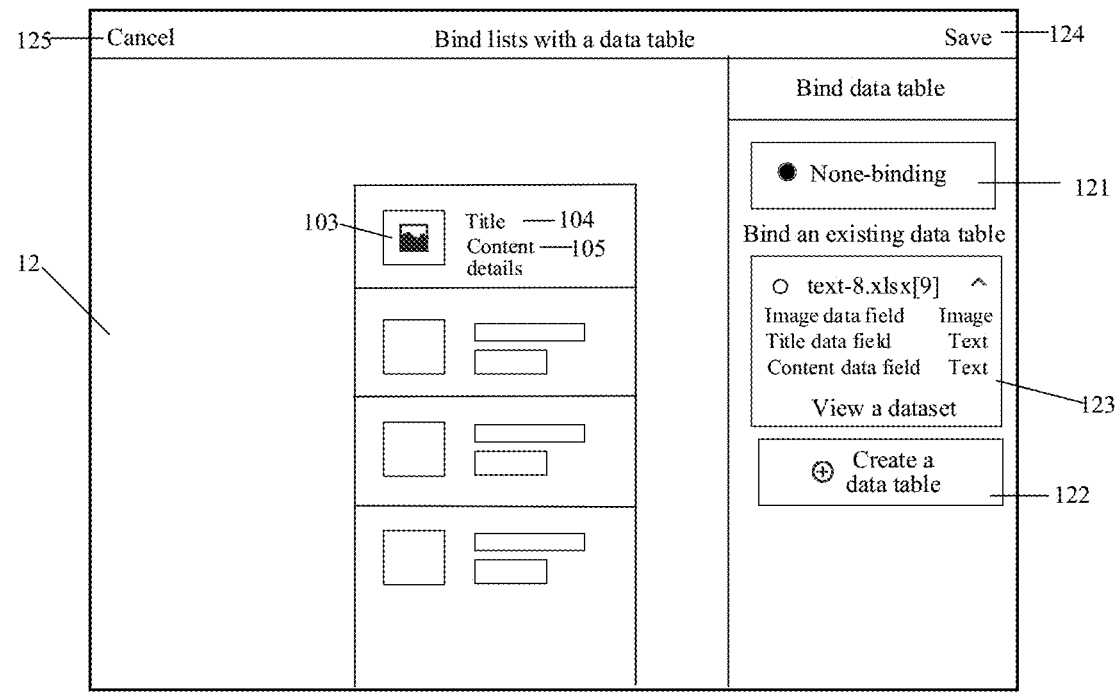
FIG. 5 is a schematic interface diagram of binding a control component with a data field according to an exemplary embodiment of this application.

Step 340 is described with reference to FIG. 5. A data table binding status 121, a data table creation option 122, a data table 123, a save option 124, and a cancel option 125, and the image control component 103, the title control component 104, and the content control component 105 on the mini program interface are displayed on a data binding interface 12 (that is, the mini program production interface 12).

In some embodiments, the data table binding status 121 is a state that no data table is bound, or is a state that at least one data table is bound. In some embodiments, when at least one data table is bound, a name of the data table is displayed. In some embodiments, the data table includes at least one data field. For example, a name of the data table is text-8.xlsx. The data table includes nine data fields, respectively corresponding to nine list items on the mini program interface, and data information included in each data field is an image data field, a title data field, and a content data field.

The data table creation option 122 is used for creating a data table on the mini program production interface 12. In some embodiments, data in the created data table may be directly entered by a user through the mini program production interface 12, or may be data obtained by adding a table file or calling a table application.

The save option 124 is used for saving an operation of a user in the mini program production interface 12, including at least one of an editing operation, a delete operation, and a modification operation. The cancel option 125 is used for exiting from the mini program production interface 12, or canceling a data table binding operation.

In conclusion, according to the method provided in this embodiment, a data source is bound with a UI control at a mini program production interface of a visualization production program, and therefore, a user may implement a process of producing a mini program without writing program code, and an ordinary user with no professional knowledge can also produce a mini program.

Figure 6:
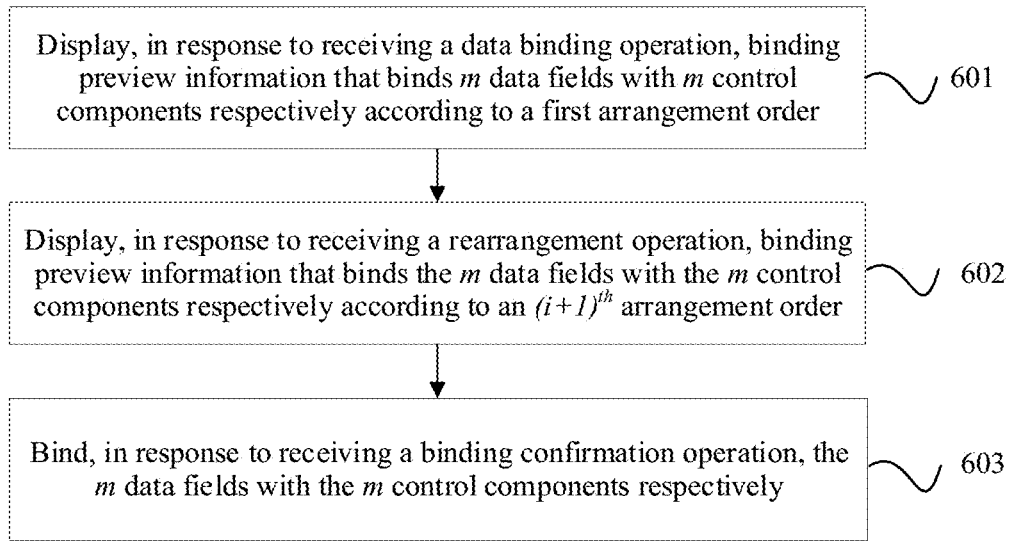
FIG. 6 is a flowchart of a method for binding a control component with a data field according to an exemplary embodiment of this application.

FIG. 6 is a flowchart of a method for binding a data field with a control component according to an exemplary embodiment of this application. The method is applied to the first terminal 120 or the second terminal 160 in the computer system shown in FIG. 2 or another terminal in the computer system. The method includes the following steps:

Step 601. Display, in response to receiving a data binding operation, binding preview information that binds m data fields with m control components respectively according to a first arrangement order.

In some embodiments, a basic UI control has m corresponding control components, and a data source includes m data fields, m being a positive integer greater than 1. For example, if m is 3, the basic UI control has three corresponding control components, and the data source includes three data fields. In some embodiments, a type of the data field includes: an image type (ImageUrl) and a character string type (String).

Figure 7:
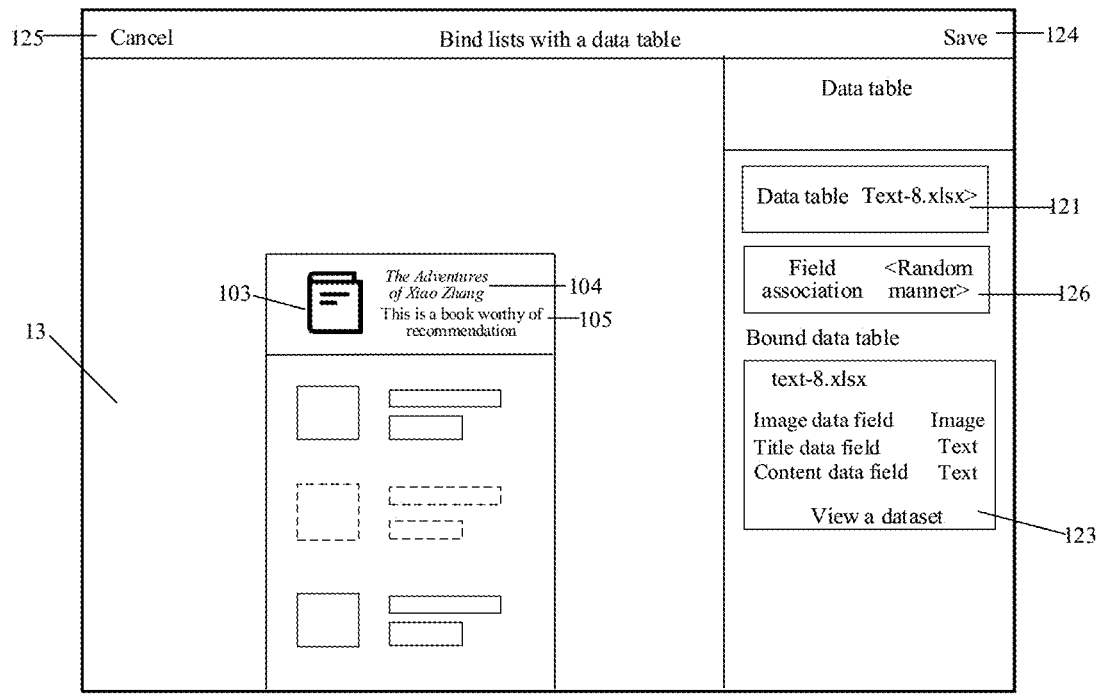
FIG. 7 is a schematic interface diagram in which a control component is bound with a data field according to an exemplary embodiment of this application.

FIG. 7 is a schematic interface diagram of binding a control component with a data field according to an exemplary embodiment of this application. A data table binding status 121, a data table 123, a save option 124, a cancel option 125, and a field association manner 126, and an image control component 103, a title control component 104, and a content control component 105 on a mini program interface are displayed on a binding interface 13.

For example, the data table binding status 121 is in a bound state, and a name of the data table is displayed on the mini program production interface. The data table 123 includes data that can be bound with a target basic UI control. In some embodiments, the data table 123 includes an image data field, a title data field, and a content data field, separately corresponding to the image control component and the text control component. In some embodiments, if the data table 123 includes a video data field, the video data field corresponds to a video control component. A user may view a dataset to view all data tables imported or added to the mini program production interface. For example, binding preview information is displayed on the mini program interface, the binding preview information being information binding three data fields with three control components according to a first arrangement order. A user checks whether binding between a data field and a control component is correct by viewing the binding preview information. For example, it is incorrect to bind an image data field with a text control component. In some embodiments, the first arrangement order is an image data field, a title data field, and a content data field.

Step 602. Display, in response to receiving a rearrangement operation, binding preview information that binds the m data fields with the m control components respectively according to an $(i+1)^{th}$ arrangement order.

In some embodiments, the field association manner 126 is a random manner or a manual manner. In some embodiments, the $(i+1)^{th}$ arrangement order is an arrangement order different from an $i^{th}$ arrangement order, i being a positive integer with an initial value being 1, and the $i^{th}$ arrangement order being generated randomly or preset in advance.

For example, the data table 123 has three data fields: an image data field, a title data field, and a content data field, and the three data fields respectively correspond to an image control component, a title control component, and a content control component. The three data fields are arranged and combined, and all arrangement combinations of the data fields are sorted according to an order. In some embodiments, the arrangement order is generated randomly, or is preset by a visualization production program platform in advance, or is preset by a user through a visualization production program platform in advance.

In an example, an image data field is represented by A, a title data field is represented by B, and a content data field is represented by C. There are six arrangement combinations (ABC, ACB, BAC, BCA, CAB, and CBA) for the three data fields, and the six arrangement combinations are sorted in a random generation manner. A second arrangement order is different from a first arrangement order (an initial value of i is 1). For example, the first arrangement order is ABC, and the second arrangement order may be ACB, BAC, BCA, CAB, or CBA. Any arrangement order may be determined as the second arrangement order, as long as the arrangement order is different from the arrangement order of ABC.

Step 603. Bind, in response to receiving a binding confirmation operation, the m data fields with the m control components respectively.

In some embodiments, the user binds the m data fields with the m control components respectively by triggering a binding button. Alternatively, the user respectively binds the m data fields with the m control components directly after selecting the data table 123. A manner of a binding confirmation operation of the user is not limited in this application.

For example, data fields in the data table 123 are bound with control components in a first list item on the mini program interface, and the data table 123 undergone binding is displayed as a bound data table. Binding preview information is displayed on the first list item of the mini program interface, the binding preview information including an image (that is, an image, corresponding to the image data field in the data table 123, displayed in the image control component 103; for example, the image is a movie poster); a title or a topic (that is, content displayed in the title control component 104; for example, the topic is a book, and a name of the book is *The Adventures of Xiao Zhang*); and a brief description or abstract of the topic content or the topic content (that is, content displayed in the content control component 105, and the brief description of the topic content only shows a part of the topic content. For example, this is a book worthy of recommendation).

Figure 8:
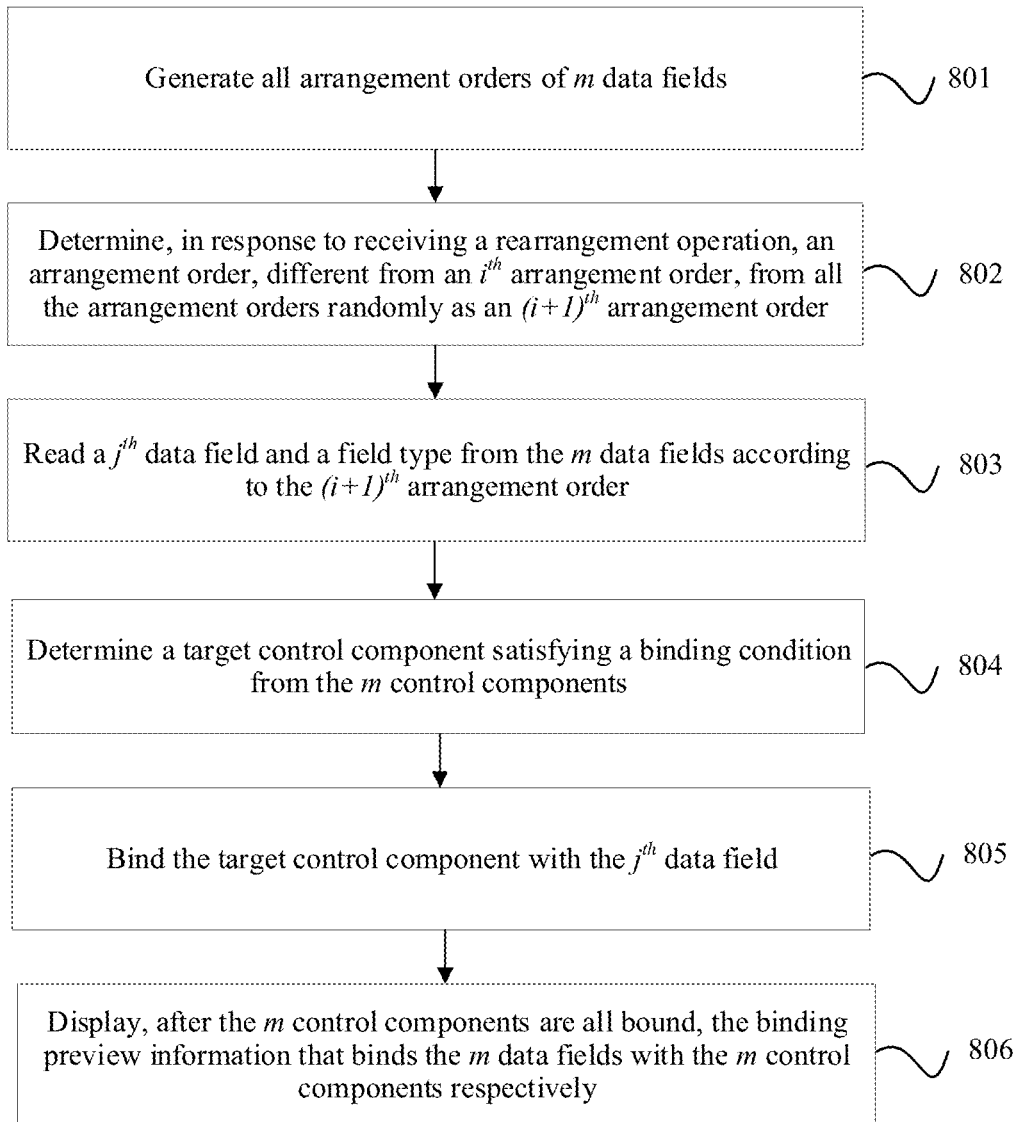
FIG. 8 is a flowchart of a method for binding a control component with a data field in a random manner according to an exemplary embodiment of this application.

Rearranging the m data fields is described with reference to FIG. 8. FIG. 8 is a flowchart of a method for rearranging m data fields according to an exemplary embodiment of this application. The method is applied to the first terminal 120 or the second terminal 160 in the computer system shown in FIG. 2 or another terminal in the computer system. The method includes the following steps:

Step 801. Generate all arrangement orders of them data fields.

For example, if m is 3, there are six arrangement orders for the three data fields.

Step 802. Determine, in response to receiving a rearrangement operation, an arrangement order, different from an $i^{th}$ arrangement order, from all the arrangement orders randomly as an $(i+1)^{th}$ arrangement order.

For example, the three data fields and three control components are respectively bound in a random manner. In an example, the three data fields are respectively A, B, and C, and all the arrangement orders are ACB, ABC, BCA, BAC, CAB, and CBA. An arrangement order (i is 1) different from a first arrangement order is randomly selected from all the arrangement orders. For example, the first arrangement order is ACB, and BCA is selected as the second arrangement order, BCA being an arrangement order different from the arrangement order of ACB.

Step 803. Read a $j^{th}$ data field and a field type from the m data fields according to the $(i+1)^{th}$ arrangement order, $1 \leq j \leq m$.

For example, the $(i+1)^{th}$ arrangement order is BCA, an arrangement order different from ACB (the $i^{th}$ arrangement order). A $j^{th}$ data field and a field type thereof are read from the three data fields according to the arrangement order of BCA. In some embodiments, $1 \leq j \leq m$, and j being a positive integer. For example, if j is 2, the second data field is read from BCA, that is, a data field represented by C and a corresponding field type. In an example, an image data field is represented by A, a title data field is represented by B, and a content data field is represented by C. A data field of C read from the arrangement order of BCA is the content data field, and the corresponding field type is a character string type.

Step 804. Determine a target control component satisfying a binding condition from the m control components.

In some embodiments, the binding condition includes that: the control component is not yet bound with a data field; or the control component matches the field type of the $j^{th}$ data field; or the control component is not yet bound with a data field and matches the field type of the $j^{th}$ data field.

For example, a target control component satisfying a binding condition is determined from the three control components. In an example, the binding condition includes that: the control component is not yet bound with a data field and matches a field type of the second data field (j is 2). In some embodiments, BCA is the $(i+1)^{th}$ arrangement order, and the field type of the second field is a character string type.

In an example, if the image control component 103 on the mini program interface does not match the field type of the second data field and a field type of the image control component 103 is an image field type, the image control component 103 is not the target control component. If the title control component 104 is bound with a title data field, the title control component 104 is not the target control component. If the content control component 105 is not yet bound with a data field and matches the field type of the second data field, the content control component 105 is the target control component.

Step 805. Bind the target control component with the $i^{th}$ data field.

For example, after the content control component 105 is determined as the target control component, the target control component is bound with the second data field, that is, the content control component 105 is bound with the content data field.

Step 806. Display, after the m control components are all bound, the binding preview information that binds the m data fields with the m control components respectively.

Figure 9:
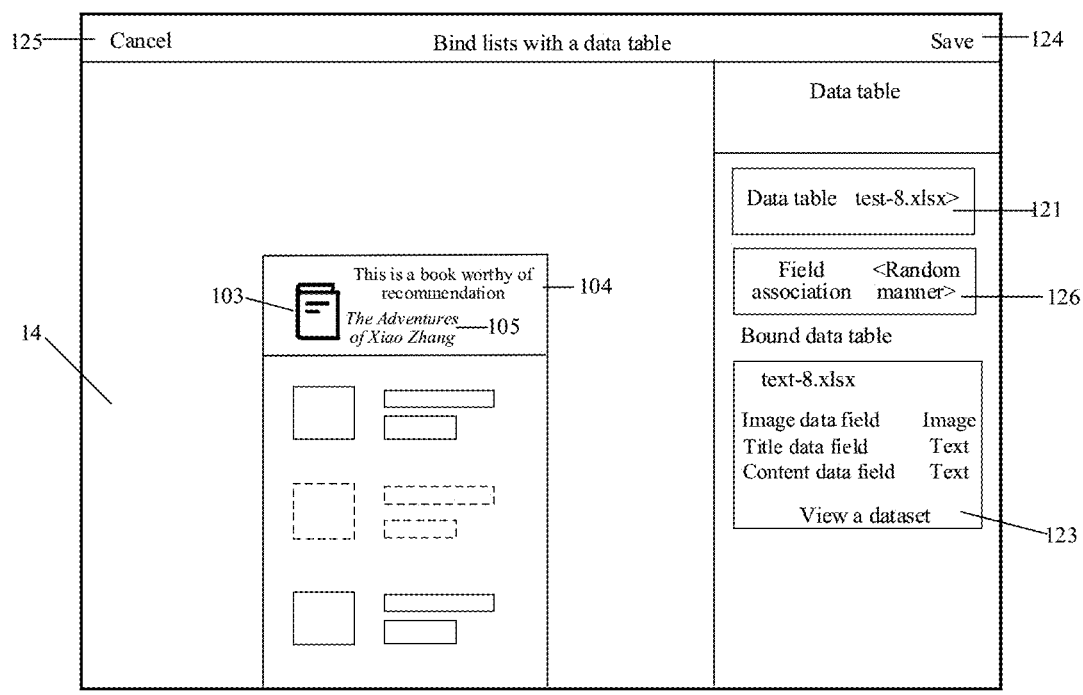
FIG. 9 is a schematic interface diagram in which a control component is bound with a data field according to another exemplary embodiment of this application.

For example, the image control component 103 and the title control component 104 are respectively bound according to the foregoing step. In an example, in a case in which the second data field (the title data field) is bound with the content control component 105 and the title control component 104 is bound with the content data field, the image control component 103 is to be bound with the image data field. As shown in FIG. 9, after the three control components are all bound, the binding preview information that binds the three data fields with the three control components respectively is displayed.

FIG. 9 is a schematic interface diagram of binding with a target control component after m data fields are rearranged according to an exemplary embodiment of this application. A data table binding status 121, a data table 123, a save option 124, a cancel option 125, and a field association manner 126, and an image control component 103, a title control component 104, and a content control component 105 on the mini program interface are displayed on a rebinding interface 14.

For example, the field association manner 126 selected by the user is a random manner, the binding preview information of the three data fields with the three control components is viewed, and when the user is not satisfied with the current binding preview information, the user reselects a field association, for example, taps a random manner button again. In some embodiments, the field association may alternatively change a current binding relationship between the data field and the control component by using a field association switching button. This is not limited in this application.

In an example, a user taps a random manner button, and a terminal generates, in response to receiving a rearrangement operation on the mini program production interface, all arrangement orders of three data fields, selects and determines an arrangement order, different from a previous arrangement order (an $i^{th}$ arrangement order), from all the arrangement orders as a current arrangement order (an $(i+1)^{th}$ arrangement order), the current arrangement order being an image data field, a title data field, and a content data field, and reads the second data field and a field type thereof (the second data field is a title data field and the field type is a character string type) from the three data fields according to the current arrangement order. Moreover, the content control component 105 is not yet bound with a data field and matches the field type of the second data field (is a field pertaining to a character string type), and therefore, the content control component 105 is determined as the target control component, and the content control component 105 is bound with the second data field (the title data field). In addition, the first data field and the third data field are respectively bound with corresponding control components: the first image data field is bound with the image control component 103, and the third content data field is bound with the title control component 104.

In a mini program interface on the rebinding interface 14, an image (that is, a cover image of a book) is displayed on the image control component 103, a content abstract (for example, this is a book worthy of recommendation) is displayed on the title control component 104, and a related title (for example, *The Adventures of Xiao Zhang*) is displayed on the content control component 105. Compared with the mini program interface shown in FIG. 7 on which the image control component 103, the title control component 104, and the content control component 105 are bound with the corresponding image data field, title data field, and content data field respectively, the title control component 104 and the content control component 105 shown in FIG. 9 are bound with the content data field and the title data field respectively.

In conclusion, by sorting all arrangement combinations of data fields (an arrangement order is generated randomly or preset in advance), an $(i+1)^{th}$ arrangement order is selected, the arrangement order being an arrangement order different from an $i^{th}$ arrangement order, so that binding relationships between the data fields and the control components are not repeated in a random manner for a user. It may be understood that, by randomly binding data fields with control components, the user can bind the data fields with the control components automatically according to the method provided in the foregoing embodiment only by triggering a rearrangement operation and without modifying a wrong binding between the data fields and the control components by using code.

Figure 10:
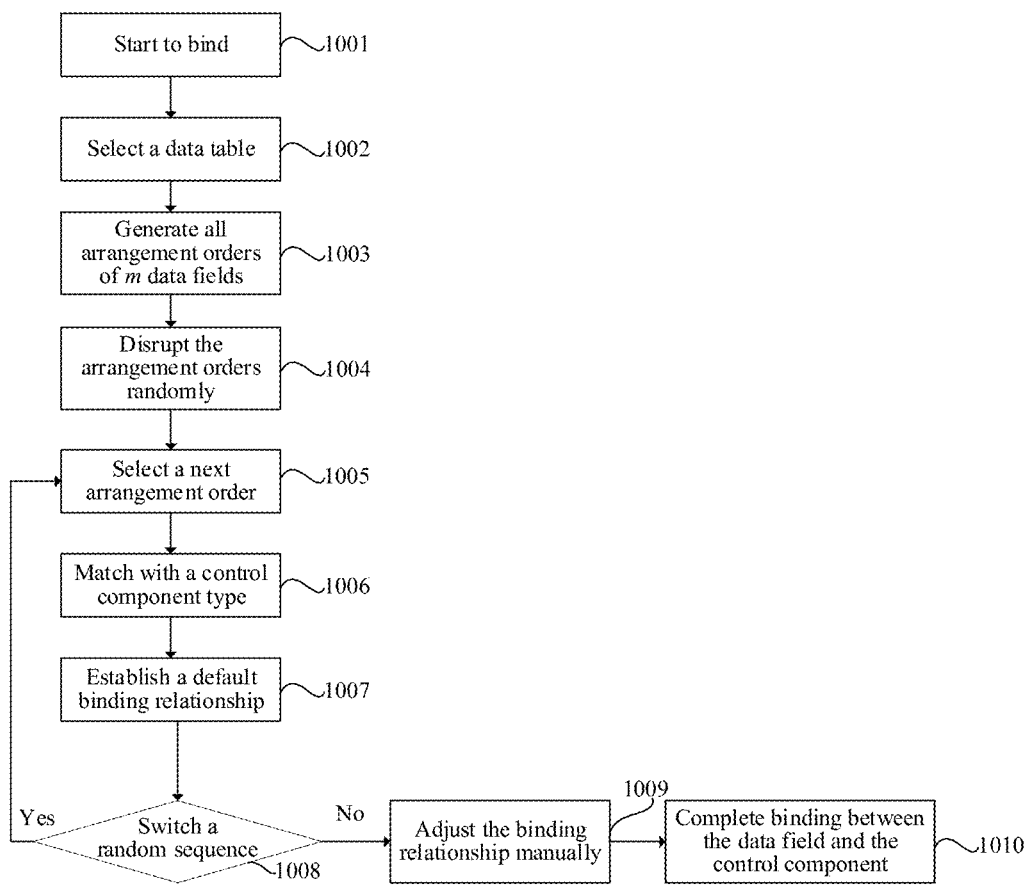
FIG. 10 is a flowchart of a data binding method of a visualization production program according to another exemplary embodiment of this application.

FIG. 10 is a flowchart of a random binding and manual binding method according to an exemplary embodiment of this application. The method is applied to the first terminal 120 or the second terminal 160 in the computer system shown in FIG. 2 or another terminal in the computer system. The method includes the following steps:

Step 1001: Start to bind.

For example, a user performs a process of producing a mini program on a tablet computer visually, that is, edits on a mini program production interface on the tablet computer in a touch control manner.

Step 1002. Select a data table.

The user selects a data table, the data table being a data source of bound data. In some embodiments, the data table includes at least one data field. In some embodiments, the user selects at least one data table according to content of the mini program. In some embodiments, the user performs a data table selection operation by adding a table file, adding data to a corresponding data table in the mini program production interface, or calling a table application on a terminal.

For example, the user performs the data table selection operation by calling a table application on the tablet computer, the table application including at least one data field corresponding to the content of the mini program.

Step 1003. Generate all arrangement orders of m data fields.

For example, if m is 3, the data table includes three data fields. After the data table selection operation of the user is received on the mini program production interface, all arrangement orders of the three data fields are generated, and there are six arrangement orders for the three data fields.

Step 1004. Disrupt the arrangement orders randomly.

In some embodiments, all of the six arrangement orders of the three data fields are disrupted randomly. Alternatively, all of the six arrangement orders of the three data fields are arranged according to a preset arrangement order. In some embodiments, the preset arrangement order is an arrangement order preset (set by default) by a visualization production program platform in advance, or is an arrangement order set by a user according to personal habits or preferences by using a setting option autonomously, or is an arrangement order generated intelligently by a server according to a historical binding relationship record of the user.

Step 1005. Select a next arrangement order.

In some embodiments, in a case that a rearrangement operation of the user is received on the mini program production interface, an arrangement order different from an $i^{th}$ arrangement order is randomly selected from all the arrangement orders and determined as an $(i+1)^{th}$ arrangement order.

For example, binding between the data field and the control component in the mini program production interface is determined according to the first arrangement order in all the arrangement orders of the data fields. When the user selects a rearrangement operation (for example, taps a random option), an arrangement order different from the first arrangement order is randomly selected from all the arrangement orders. For example, the third arrangement order is selected from all the arrangement orders and determined as a next $(i+1)^{th}$ arrangement order.

Step 1006. Match with a control component type.

In some embodiments, the control component type includes at least one of a text type, an image type, a video type, an audio type, and an animation type. For example, the visualization production program platform matches an image data field with an image control component.

Step 1007. Establish a default binding relationship.

The visualization production program platform binds a data field with a control component to establish a binding relationship. In some embodiments, the binding relationship is a default binding relationship of the visualization production program platform, and the default binding relationship is a default setting of the visualization production program platform to the binding relationship.

Step 1008. Switch a random sequence.

For example, the user taps a random option to switch an arrangement order of the data fields, and step 1005 is performed; and otherwise, step 1009 is performed.

Step 1009. Adjust the binding relationship manually.

Figure 11:
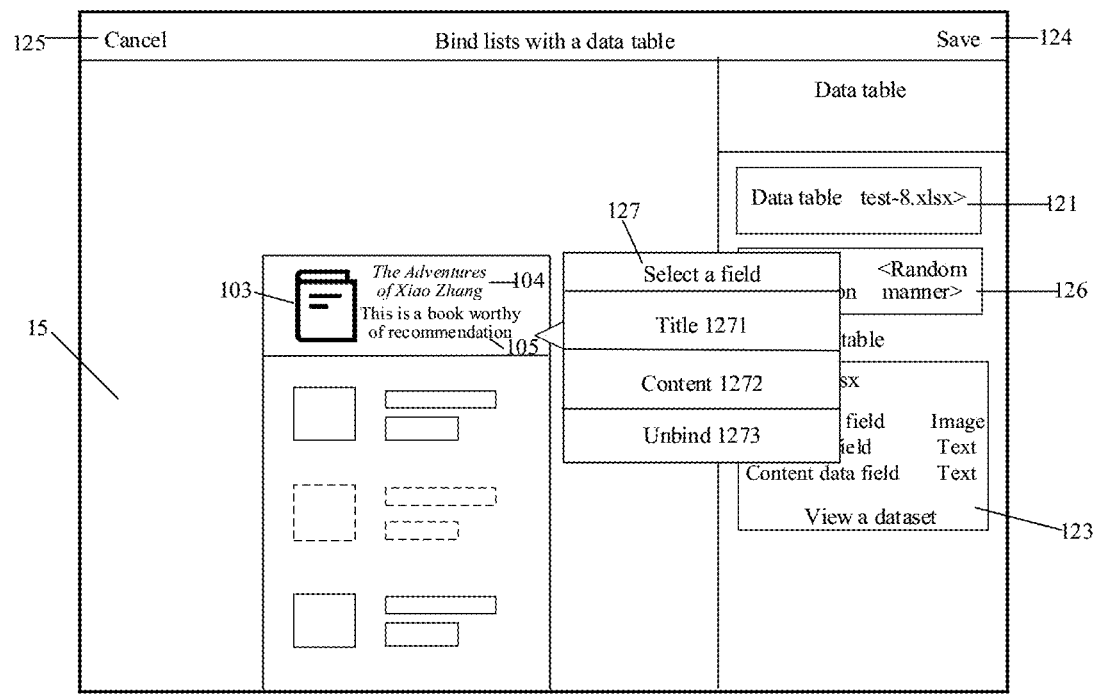
FIG. 11 is a schematic interface diagram of manually binding a control component with a data field according to an exemplary embodiment of this application.

In some embodiments, the user may further adjust a binding relationship between the data field and the control component manually. A process of adjusting the binding relationship manually is described with reference to FIG. 11. FIG. 11 is a schematic interface diagram of a binding modification operation according to an exemplary embodiment of this application. A data table binding status 121, a data table 123, a save option 124, a cancel option 125, a field association manner 126, and a candidate data field 127, and an image control component 103, a title control component 104, and a content control component 105 on a mini program interface are displayed on a binding modification operating interface 15.

A binding modification operation on a target control component of a target basic UI control on the mini program production interface is received, and at least one candidate data field 127 corresponding to the target control component is displayed. In some embodiments, the candidate data field 127 may be displayed in a manner of a table or dialog box, and the candidate data field 127 is a data field, whose field type matches the target control component, in at most m data fields. In an example, the candidate data field 127 is displayed in a manner of a dialog box. A title option 1271, a content option 1272, and an unbinding option 1273 are displayed in a dialog box of the candidate data field 127. The title option 1271 is used for matching a title data field with a title control component. The content option 1272 is used for matching a content data field with a content control component. The unbinding option 1273 is used for performing an unbinding operation on a binding relationship between a selected data field and control component.

In some embodiments, the user taps the unbinding option 1273 to unbind a content data field and the content control component 105, and then taps the content option 1272 to bind the content data field with the content control component 105. Alternatively, the user directly taps the content option 1272 to bind the content data field with the content control component 105. In some embodiments, binding the content data field with the content control component 105 may be binding a content data field which is imported to the visualization production program with the content control component 105, or binding a new content data field reselected from the data table (that is, the data source) with the content control component 105.

Step 1010. Complete binding between the data field and the control component.

In a case that a selection operation is received, a data field selected from the at least one candidate data field is bound with the target control component. In some embodiments, the selection operation is a tap operation, a double-tap operation, a drag operation, a slide operation, or a long press operation.

For example, the user taps the content option 1272 to bind the content data field with the content control component 105.

In some embodiments, after binding the data field with the control component, the user taps the save option 124 to save the produced mini program, exits from a data binding interface, and enters a mini program production interface 16.

Figure 12:
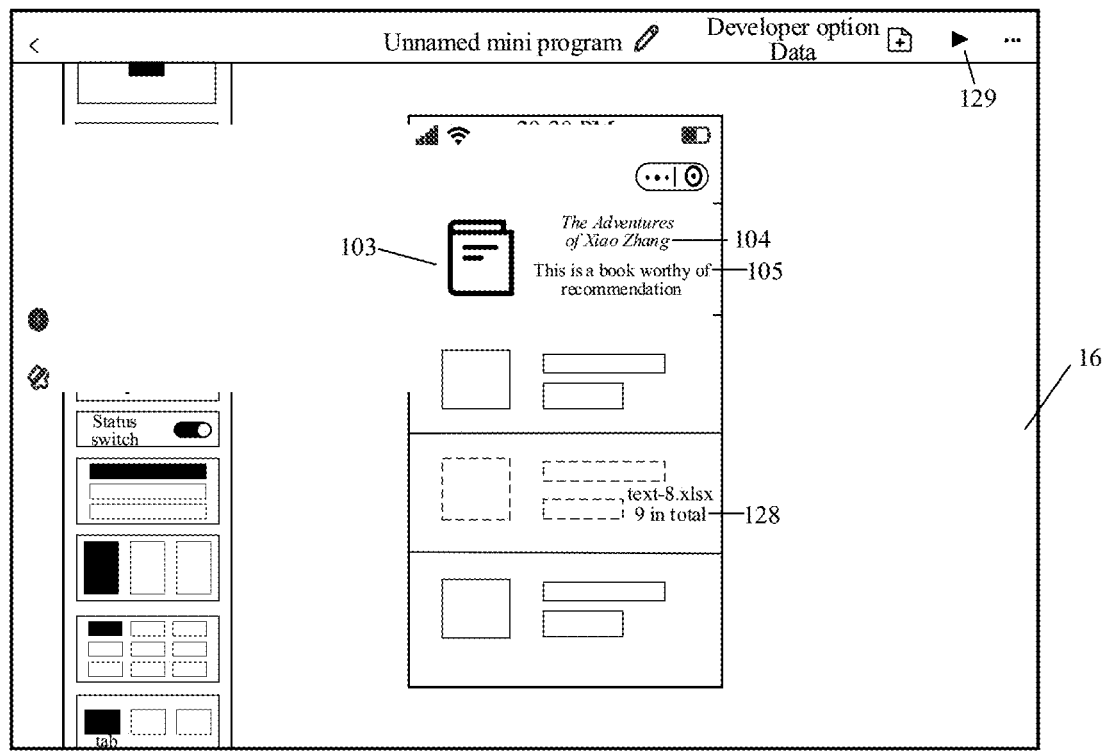
FIG. 12 is a schematic diagram of a mini program production interface in which a control component is bound with a data field according to an exemplary embodiment of this application.

FIG. 12 is a schematic interface diagram of saving a mini program according to an exemplary embodiment of this application. An image control component 103, a title control component 104, and a content control component 105, a bound data field 128, and a preview control 129 are displayed on the mini program production interface 16.

In some embodiments, the data field 128 in which data binding is completed is displayed on the mini program production interface 16. In some embodiments, there are nine data fields, the data field is added by using a table file, and a name of the table file is text-8. The user taps the preview control 129, the preview control 129 being used for pushing a program package of the mini program to a host application program for at least one operation of running and previewing. The previewing means that, when a mini program is produced but not published on the host application program, the user may browse or use the mini program in advance to check content or function of the mini program for errors. The running means to check whether the mini program can be normally used in the host application program.

In some embodiments, the preview control is a triangle. In some embodiments, the preview control is a circle, a rectangle, a hexagon, or a polygon. Alternatively, the preview control is a virtual button displayed with "preview". A form of the preview control is not limited in this application.

Figure 13:
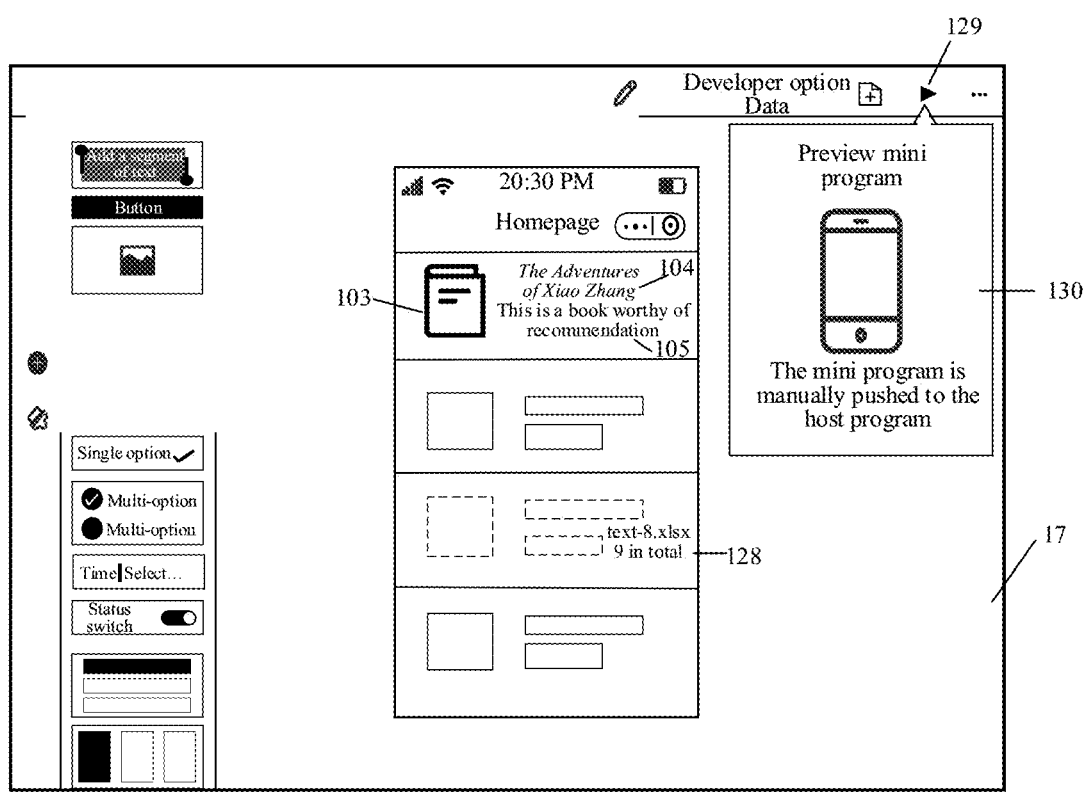
FIG. 13 is a schematic diagram of a preview interface of a mini program according to an exemplary embodiment of this application.

FIG. 13 is a schematic interface diagram of mini program preview prompt information according to an exemplary embodiment of this application. An image control component 103, a title control component 104, and a content control component 105, a bound data field 128, a preview control 129, preview prompt information 130 are displayed on a mini program preview prompt interface 17.

In some embodiments, when the user taps the preview control 129, the preview prompt information 130 is displayed; or when the user uses a terminal connected with an external device (for example, uses a desktop computer connected with a mouse), the preview prompt information 130 is displayed when an identifier corresponding to the external device is moved to the preview control; or when the user uses a function of previewing the mini program for the first time, the preview prompt information 130 is displayed for prompting the user. In an example, the user uses the visualization production program platform on the desktop computer, and when a mouse cursor is moved to the preview control 129, the preview prompt information 130 is displayed. When the user clicks the preview control 129, the produced mini program is previewed.

In some embodiments, "The mini program is manually pushed to the host application program" is displayed on the preview prompt information 130. In some embodiments, "pushed" is displayed on the preview prompt information 130. This is not limited in this application.

In some embodiments, the user may automatically push the mini program to the host application program for previewing by using manual pushing on the preview prompt information 130. In some embodiments, the manual pushing may be that the user opens a preview interface of a mini program by copying a link of the mini program to a host application program, or may be that the user generates a graphic code corresponding to a preview interface of a mini program, and calls a camera in a terminal or a scanning function in a host application program to scan the graphic code to open the preview interface. This is not limited in this application.

Figure 14:
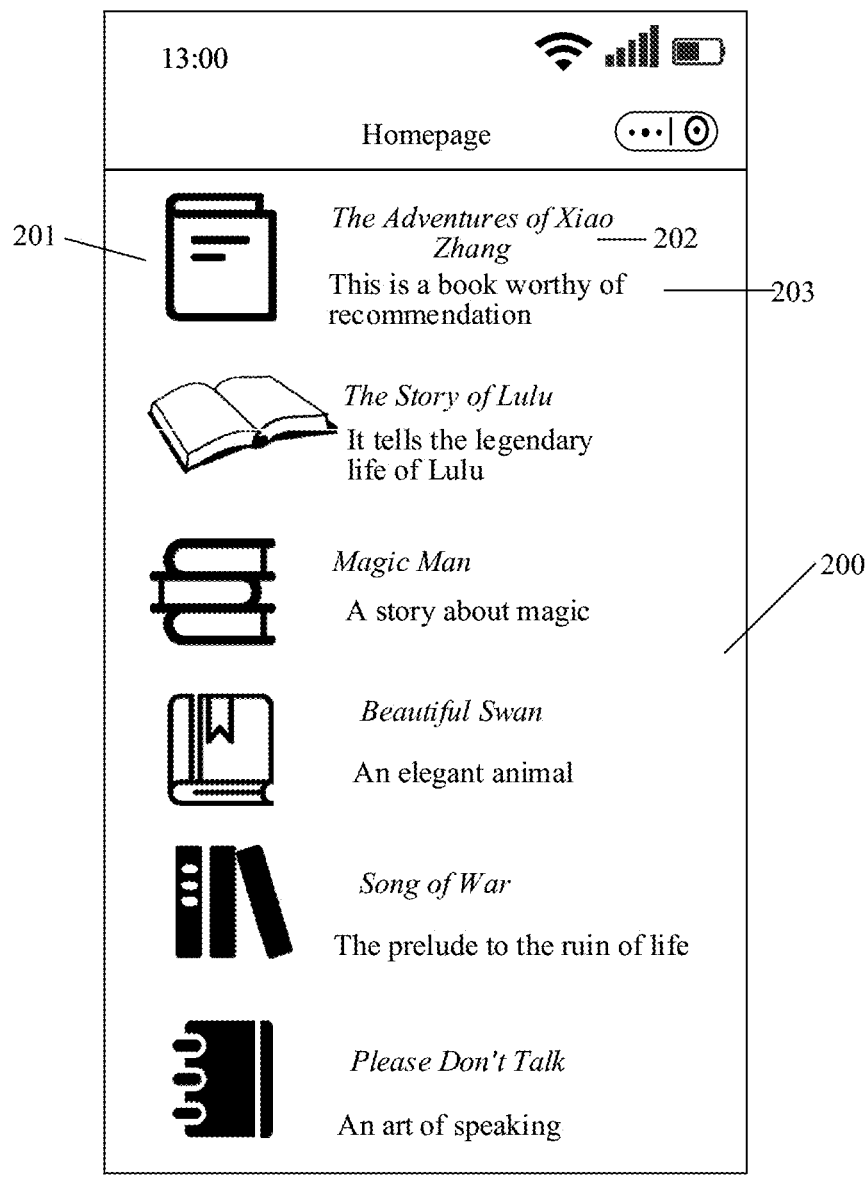
FIG. 14 is a schematic diagram of a preview interface of a mini program on a terminal according to an exemplary embodiment of this application.

FIG. 14 is a schematic diagram of a preview interface of a mini program on a terminal according to an exemplary embodiment of this application. An image 201, a title 202, and content 203 are displayed on a mini program preview interface 200. In an example, the image 201 is a cover of a book, the title 202 is a name of the book (for example, *The Adventures of Xiao Zhang*), and the content 203 is a content brief description or a review of the book (for example, this is a book worthy of recommendation).

In some embodiments, the mini program preview interface 200 further includes content displayed after other data fields and control components are bound. For example, there are six items of content displayed on the mini program preview interface 200, and the six items of content being content generated after six data fields are bound with corresponding control components.

Figure 15:
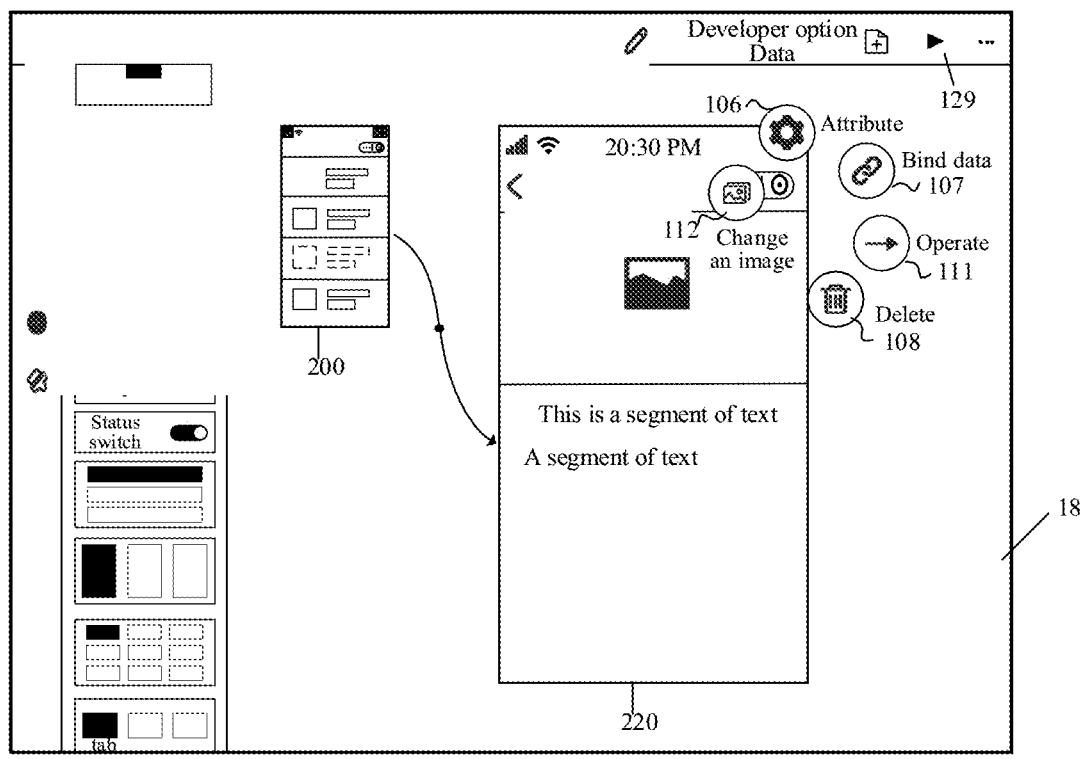
FIG. 15 is a schematic interface diagram of performing data binding on a next hierarchy of program interface according to an exemplary embodiment of this application.

In some embodiments, the mini program further includes a next hierarchy of program interface, the next hierarchy of program interface being a program interface displayed after a target basic UI control is triggered. The user produces the next hierarchy of program interface. FIG. 15 is a schematic diagram of a production interface of a next hierarchy of program interface according to an exemplary embodiment of this application. A completed mini program interface (that is, the mini program preview interface) 200, a next hierarchy of program interface 220, an attribute option 106, a data binding option 107, a delete option 108, an operating option 111, an image changing option 112, and a preview control 129 are displayed on a production interface 18 of a next hierarchy of program interface.

In some embodiments, the completed mini program interface 200 is the mini program interface shown in FIG. 14. In some embodiments, the user taps the mini program interface 200 to generate a next hierarchy of program interface, or generate a next hierarchy of program interface by adding a list option template (not shown), the list option template being a template or sample for setting an interface or layout of a mini program. In an example, the user taps the mini program interface 200 to generate the next hierarchy of program interface 220. In some embodiments, the user names the program interface 220 as a page 1. The operating option 111 is used for editing the mini program interface 220, or performing a custom setting on the mini program interface 220. For example, the user selects the operating option 111 to enter a mini program custom setting interface. The image changing option 112 is used for changing an image in a mini program. In some embodiments, an image is changed by calling a local gallery or album in a terminal by using a visualization production program platform, or an image in the mini program is changed by connecting to a network and obtaining an image from the network, or an image in the mini program is changed by receiving an image file.

Figure 16:
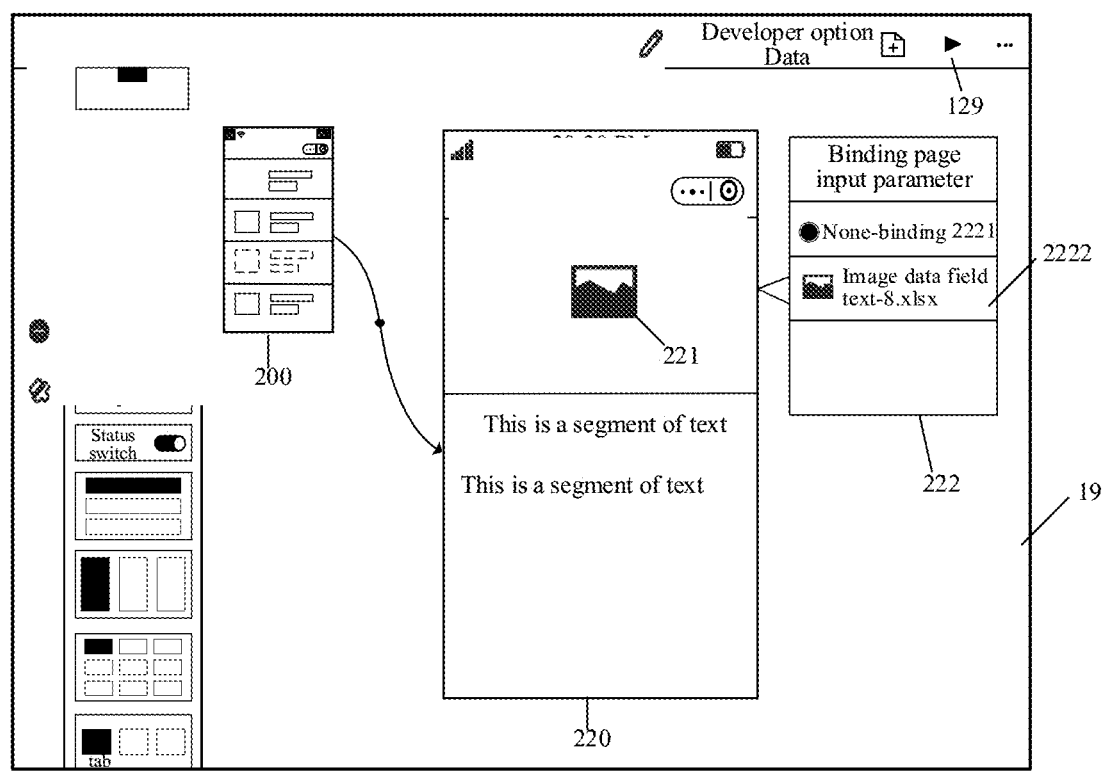
FIG. 16 is a schematic interface diagram of performing data binding on a next hierarchy of program interface according to another exemplary embodiment of this application.

The user performs a data binding operation on the next hierarchy of program interface 220 by using the data binding option 107, and the process is described with reference to FIG. 16. FIG. 16 is a schematic interface diagram of performing data binding on a next hierarchy of program interface according to an exemplary embodiment of this application. A completed mini program interface 200, a next hierarchy of program interface 220, an image control component 221, a binding page input parameter 222, a delete option 108, an operating option 111, an image changing option 112, and a preview control 129 are displayed on a data binding interface 19.

In some embodiments, the user taps the image control component 221, and the data binding option 107 is displayed. The user taps the data binding option 107, and the binding page input parameter 222 is displayed. In some embodiments, a none-binding option 2221 and an image data field option 2222 are displayed on the binding page input parameter 222. In some embodiments, at least one of a title binding data field, a content binding data field, a video binding data field, and an animation binding data field is further displayed on the binding page input parameter 222. In an example, the user selects the none-binding option 2221, and in this case, the image control component 221 is not yet bound with any image data field. If the user selects the image data field option 2222, the image control component 221 is bound with a data field corresponding to the image data field option 2222, and an image is displayed at a position corresponding to the image control component 221. In some embodiments, the image data field option 2222 further includes a table file name corresponding to the data field.

In some embodiments, after the user completes the data binding operation on the next hierarchy of program interface 220, the data field bound with the target control component is automatically bound with a corresponding control component in the next hierarchy of program interface by using the visualization production program platform.

For example, the user taps a list option on the mini program interface shown in FIG. 14. For example, the user taps a first list option (corresponding to a column of "*The Adventures of Xiao Zhang*"), a next hierarchy of program interface (that is, a page 1 is jumped to from a homepage interface) is jumped to. After a target control component corresponding to the first list option is bound with a data field, the data field is automatically bound with a corresponding control component in the next hierarchy of program interface 220 (that is, the next hierarchy of program interface 220 displaying bound data, that is, a page displaying details).

Figure 17:
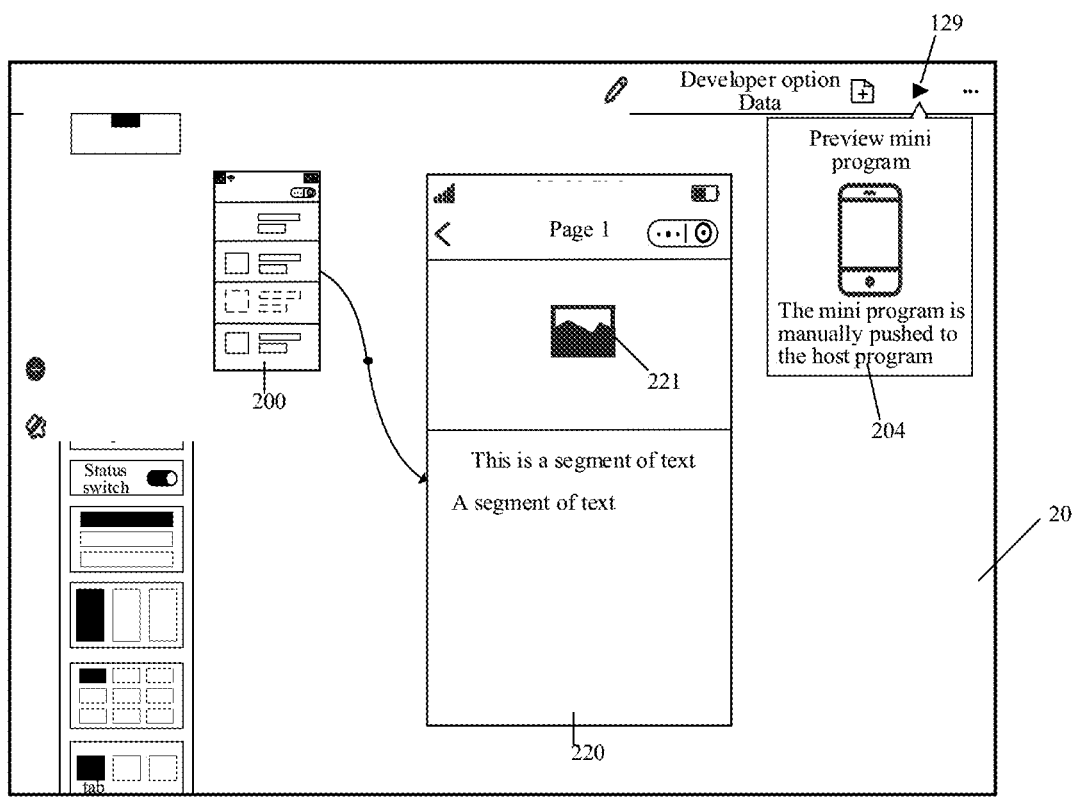
FIG. 17 is a schematic diagram of a preview interface of a mini program according to another exemplary embodiment of this application.

FIG. 17 is a schematic diagram of a preview interface of a next hierarchy of program interface according to an exemplary embodiment of this application. A completed mini program interface 200, a next hierarchy of program interface 220, an image control component 221, preview prompt information 204, and a preview control 129 are displayed on the preview interface 20.

In some embodiments, the user selects the preview control 129 to preview the next hierarchy of program interface 220. The preview prompt information 204 is used for prompting the user that a mini program is pushed to a host application program. In some embodiments, the user may push the next hierarchy of program interface 220 to a host application program in a manual pushing manner, and the process is consistent with the process of pushing a mini program interface (that is, a homepage interface). This is not repeated herein.

Figure 18:
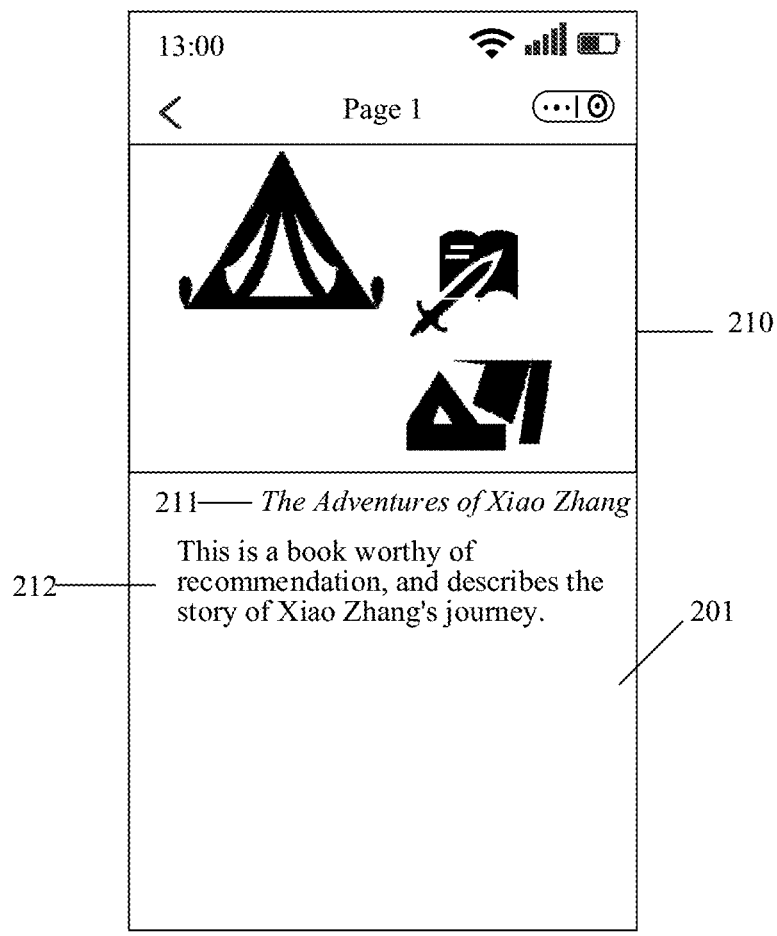
FIG. 18 is a schematic diagram of a preview interface of a mini program on a terminal according to another exemplary embodiment of this application.

FIG. 18 is a schematic diagram of a next hierarchy of program interface on a terminal according to an exemplary embodiment of this application. An image 210, a title 211, and content 212 are displayed on the next hierarchy of program interface 220. In some embodiments, the user taps the first list item (as shown in FIG. 14, a title corresponding to the first list item is *The Adventures of Xiao Zhang*) on the homepage interface of the mini program, a page is jumped to the next hierarchy of program interface 220 (that is, a page 1, specific content about "*The Adventures of Xiao Zhang*" is displayed on the page 1; for example, this is a book worthy of recommendation, and describes the story of Xiao Zhang's journey).

In a case that a data binding operation corresponding to a target basic UI control on the program interface of the mini program is received, and after the target basic UI control is bound with the data source according to the data binding operation, optionally, the user may select program code generating a mini program. The visualization production program platform generates view layer code of the mini program according to a basic UI control on the program interface of the mini program, for example, generates the view layer code of the mini program according to an image control component; generates logic layer code of the mini program according to a data source bound with a basic UI control on the program interface of the mini program, for example, generates logic layer code of the mini program according to an image data field bound with an image control component; and generates a program package of the mini program according to the view layer code and the logic layer code, then transmits the program package of the mini program to a host application program for at least one of a running operation and a preview operation, or transmits the program package of the mini program to a program platform of the host application program for auditing or publishing.

For example, the visualization production program platform determines a list item template component for which code needs to be generated, recursively generates markup language (ML) code corresponding to the image control component, adds code (such as, loop statement code: for statement) representing a loop statement to the list item template component, and binds an attribute value with an array by using the code representing the loop statement, so as to repeatedly render the list item template component by using all data in the array, the attribute value being a name of a bound data table or a name corresponding to a bound data field. The visualization production program platform determines control components for which code needs to be generated, recursively generates each control component and corresponding ML code, checks whether the control component is bound with a data field, and adds, in a case that the control component is bound with a data field, a name of the data field to the ML code. The list item template component is a template component corresponding to a structure or a frame that can hold data in a mini program interface. The recursive generation means that a program directly or indirectly calls an own program during running. A complex problem can be converted into a simple problem similar to the original problem to resolve only by using a small amount of program code.

For example, the visualization production program platform converts a format of a bound data table into a JavaScript Object Notation (JSON) format, the format storing and representing data by using a text format independent of a programing language, which is convenient for a user to read and write. A computer can generate a file of the format or parse a file of the format more easily. The visualization production program platform places the data table converted into a JSON format into a data object corresponding to page logic code. When the program package of the mini program is pushed to the host application program for running, the user may see that the list item template component bound with the data field is rendered as an actual list (that is, a page of the mini program) together. Rendering means that a list item or a basic UI control and corresponding data are converted into content displayed in a corresponding program by using code.

For example, when creating a relationship of jumping from a list item to a new page, the visualization production program platform adds, in a case that the list item is detected to be bound with a data field, the bound data field to code representing a jumped-to page, reads an index of the data field from an event response function corresponding to code (such as bindtap code) of a binding interaction type, obtains a data field corresponding to an actual obtained new page according to the index, and refreshes the data field to the new page by calling a set data (setData function refers to transmitting data from a logic layer to a view layer) method.

A developer with professional knowledge may select to generate program code of a mini program, and modify content of the mini program by modifying corresponding code.

Figure 19:
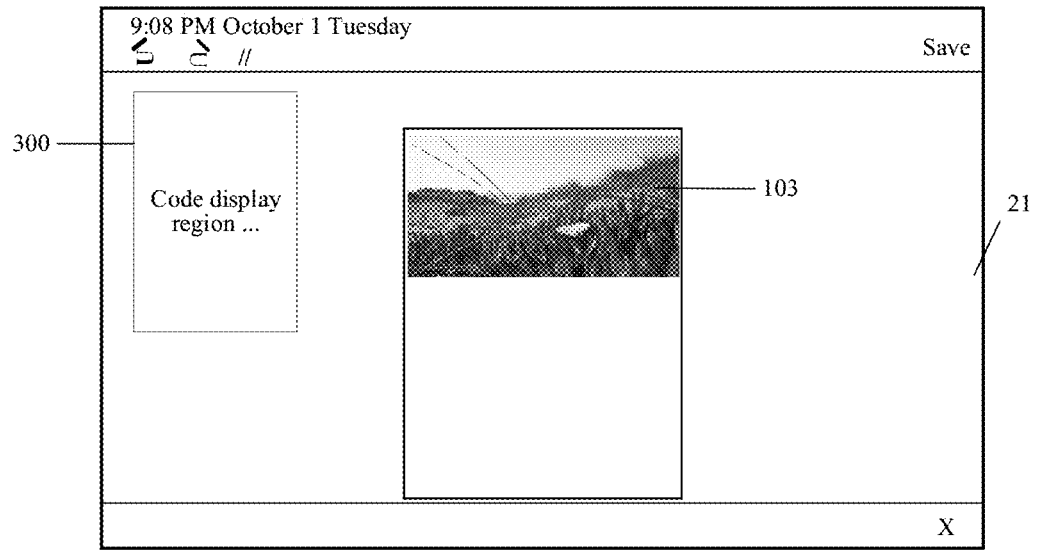
FIG. 19 is a schematic interface diagram of logic editing according to an exemplary embodiment of this application.
Figure 19:
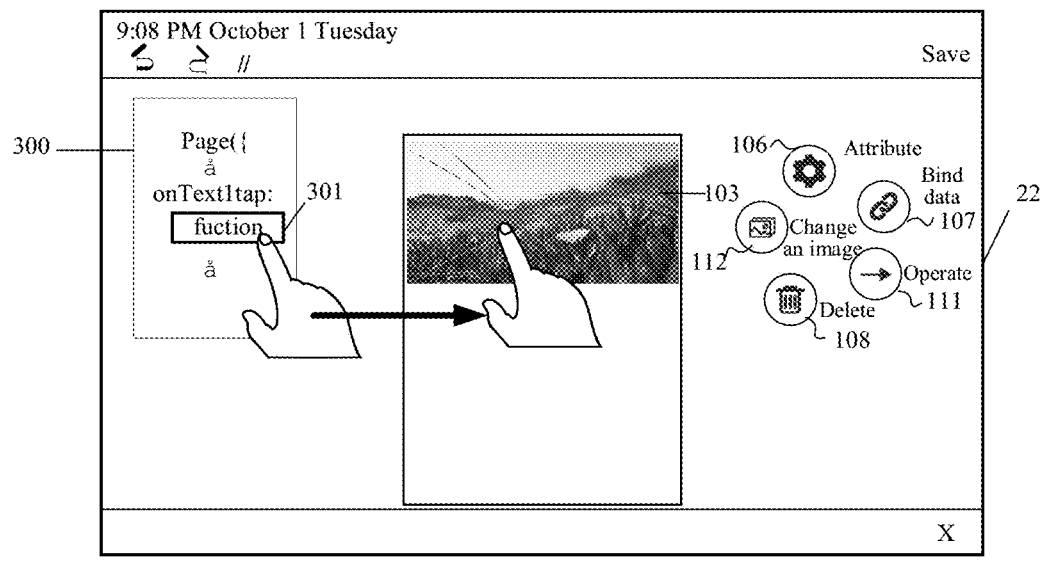

FIG. 19 is a schematic interface diagram of logic editing according to an exemplary embodiment of this application. As shown in FIG. 19(*a*), a code display region 300 and an image control component 103 are displayed on a logic editing interface 21. A user operates according to a related code editing method when performing code editing on the code display region 300 and jumping from a current page to a next page, or viewing an attribute of a target UI control, and the user needs to edit code corresponding to all functions that the target UI control may implement. If the user does not have professional knowledge in the code editing, difficulty in the code editing is caused.

In an example, in a case that a triggering operation of a user on a target control component is received, the visualization production program obtains a function option (for example, an attribute option 106, a data binding option 107, or a delete option 108) corresponding to the target control component. Function code corresponding to the target control component is automatically typed into the code display region 300, that is, the function code (such as function code) related to the currently edited target control component is automatically typed into a line of code requiring typing function code, thereby providing convenience for users having a code editing ability.

In some embodiments, before receiving the triggering operation of the user on the target control component, the method further includes receiving a triggering operation generated in a code region in a case that function code corresponding to a target control component needs to be typed into. In some embodiments, the triggering operation on the target control component includes a tap operation, a double-tap operation, and the like on the target control component, and this is not limited in this embodiment of this application.

For example, as shown in FIG. 19(b), in the code display region 300, content needs to be typed into a variation region 301 is function code of a current target control component. After a tap operation of the user on the variation region 301 is received, a tap operation of the user on the target control component is waited to be received. After a tap operation of the user on the image control component 103 is received, the visualization production program displays function options corresponding to the image control component, for example, an attribute option 106, a data binding option 107, a delete option 108, an operating option 111, and an image changing option 112. In this case, function code corresponding to the image control component 103 is automatically typed into and displayed on the variation region 301, and therefore, the user does not need to manually type the function code of the image control component 103 in the variation region 301.

In some embodiments, after a mini program is produced and content of the mini program is confirmed to have no error, the user may transmit the mini program to a host application program. For example, the user taps a submitting control, and in a case that a submitting operation on the submitting control is received by a mini program production interface of the visualization production program, a program package of the mini program is transmitted to a program platform of the host application program for auditing or publishing. In some embodiments, the submitting control may be alternatively named as a submitting option or an uploading option, and this is not limited in this application. In some embodiments, after succeeding in auditing, the mini program may be used by other users.

Figure 20:
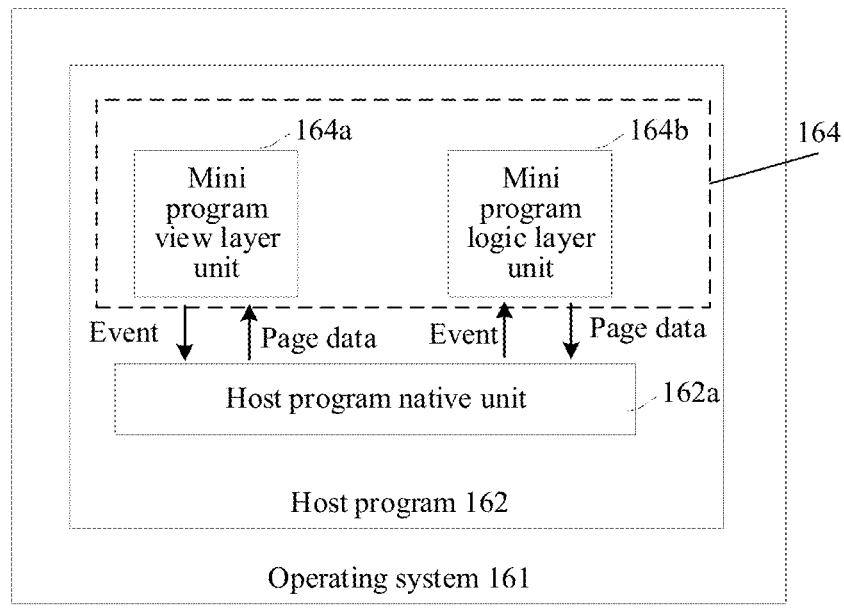
FIG. 20 is a structural block diagram of a terminal according to an exemplary embodiment of this application.

FIG. 20 is a structural block diagram of a terminal according to an exemplary embodiment of this application. A host application program 162 and a mini program 164 are installed and run on a user terminal. The host application program 162 may be any one of an instant messaging program, a social program, and a payment program. An example in which the terminal is an instant messaging program is used for description in this application. A mini program is a program executed in the host application program 162. There may be a plurality of mini programs, one of which is a mini program produced by a user. The user enters the produced mini program 164 by using the host application program 162. In some embodiments, the mini program produced by the user needs to obtain information (for example, an account, a communication number, and a geographic location of the user) of the user or does not need to obtain the information of the user.

The host application program 162 is an application for a user to produce a mini program 164, and provides an environment for the user to produce the mini program 164. The host application program 162 is a native application. The native application is an application that may be directly run on an operating system 161. The host application program 162 may be a social application, a dedicated application specially supporting the production of the mini program 164, a file management application, an email application, a game application, or the like. The social application includes an instant messaging application (for example, WeChat and QQ), a social network service (SNS) application, a live broadcast application, or the like. The mini program is an application that may be run in an environment provided by the host application program. The mini program may be a social application, a file management application, a mail application, a game application, or the like. An example in which the mini program is the mini program 164 produced by the user is used for description. The host application program 162 may be a WeChat program.

A mini program logic layer unit 164b and a corresponding mini program view layer unit 164a are configured to implement an instance of the mini program. One mini program may be implemented by using one mini program logic layer unit 164b or at least one mini program view layer unit 164a. The mini program view layer unit 164a and a mini program page may be in a one-to-one correspondence.

The mini program view layer unit 164a is configured to organize and render a view of the mini program. The mini program logic layer unit 164b is configured to process a data processing logic of the mini program and the corresponding mini program page. A unit may be a process or a thread. For example, the mini program view layer unit 164a is a mini program view layer thread, and the mini program logic layer unit 164b is a mini program logic layer thread. The mini program logic layer unit 164b unit may be run in a virtual machine. The mini program view layer unit 164a and the mini program logic layer unit 164b may perform relay communication with each other by using a host application program native unit 162a. The host application program native unit 162a is an interface for the host application program 162 and the mini program to communicate with each other, and the host application program native unit 162a may be a thread or process of the host application program 162. Page logic code of a program package to which each mini program page pertains may be registered when the mini program logic layer unit 164b is started, and the registered page logic code is executed when the page logic code is needed to process data.

A method, system, and service scenario described in the embodiments of this application is for more clearly describing the technical solutions in the embodiments of this application, and does not constitute a limitation on the technical solutions provided in the embodiments of this application. Persons of ordinary skill may learn that, with evolution of technologies and appearance of a new service scenario, the technical solutions provided in the embodiments of this application also apply to a similar technical problem.

The following is an apparatus embodiment of this application. For details not described in detail in the apparatus embodiment, reference may be made to corresponding record in the foregoing method embodiments. Details are not repeated herein.

Figure 21:
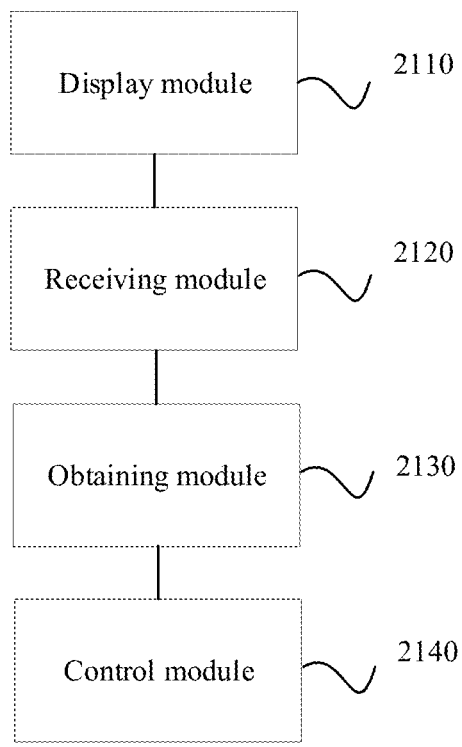
FIG. 21 is a schematic structural diagram of a mini program data binding apparatus according to an exemplary embodiment of this application.

FIG. 21 is a schematic structural diagram of a mini program data binding apparatus according to an exemplary embodiment of this application. The apparatus may be implemented as the terminal or a part of the terminal by means of software, hardware, or a combination thereof. The apparatus includes: a display module 2110, a receiving module 2120, an obtaining module 2130, and a control module 2140. The receiving module 2120 is an optional module.

The display module 2110 is configured to display a mini program production interface of a visualization production program including a panel region and an editing region, the panel region being provided with n types of basic UI controls, n being a positive integer.

The receiving module 2120 is configured to generate, in response to receiving a user operation on a selected basic UI control, a program interface of the mini program in the editing region according to the selected basic UI control.

The obtaining module 2130 is configured to obtain a data source.

The receiving module 2120 is further configured to bind, in response to receiving a data binding operation corresponding to a target basic UI control on the program interface of the mini program, the target basic UI control with the data source, the data source being used for displaying the target basic UI control.

In one implementation, the basic UI control has m corresponding control components, and the data source includes m data fields, m being a positive integer greater than 1.

The display module 2110 is configured to display, in response to receiving the data binding operation, binding preview information that binds the m data fields with the m control components respectively according to a first arrangement order.

The display module 2110 is configured to display, in response to receiving a rearrangement operation, binding preview information that binds the m data fields with the m control components respectively according to an $(i+1)^{th}$ arrangement order, the $(i+1)^{th}$ arrangement order being an arrangement order different from an $i^{th}$ arrangement order, i being a positive integer with an initial value being 1, and the $i^{th}$ arrangement order being generated randomly or preset in advance.

The receiving module 2120 is configured to bind, in response to receiving a binding confirmation operation, the m data fields with the m control components respectively.

In one implementation,
the control module 2140 is configured to generate all arrangement orders of the m data fields;
the receiving module 2120 is configured to determine, in response to receiving the rearrangement operation, an arrangement order, different from the $i^{th}$ arrangement order, from all the arrangement orders randomly as the $(i+1)^{th}$ arrangement order; and
the display module 2110 is configured to display the binding preview information that binds the m data fields with the m control components respectively according to the $(i+1)^{th}$ arrangement order.

In one implementation,
the obtaining module 2130 is configured to read a $i^{th}$ data field and a field type thereof from the m data fields according to the $(i+1)^{th}$ arrangement order, $1 \leq j \leq m$, and j being a positive integer;
the control module 2140 is configured to determine a target control component satisfying a binding condition from the m control components, the binding condition including that: the control component is not yet bound with a data field; or the control component matches the field type of the $j^{th}$ data field; or the control component is not yet bound with a data field and matches the field type of the $j^{th}$ data field; and bind the target control component with the $j^{th}$ data field; and
the display module 2110 is configured to display, after the m control components are all bound, the binding preview information that binds the m data fields with the m control components respectively.

In one implementation,
the receiving module 2120 is configured to receive a binding modification operation on the target control component on the target basic UI control;
the display module 2110 is configured to display at least one candidate data field corresponding to the target control component, the candidate data field being a data field, whose field type matches the target control component, in the m data fields; and
the control module 2140 is configured to bind, in response to receiving a selection operation, a data field selected from the at least one candidate data field with the target control component.

In one implementation, the mini program further includes a next hierarchy of program interface, the next hierarchy of program interface being a program interface displayed after the target basic UI control is triggered; and
the control module 2140 is configured to bind the data field bound with the target control component with a corresponding control component in the next hierarchy of program interface automatically.

In one implementation,
the display module 2110 is configured to display a first table file; and the receiving module 2120 is configured to receive an addition operation, the addition operation being used for adding the first table file to the visualization production program; or
the receiving module 2120 is configured to receive a program calling operation, the program calling operation being used for calling a table application in the visualization production program, and the table application including a second table file; or
the receiving module 2120 is configured to receive a third table file by using a short range wireless communication technology.

In one implementation,
the control module 2140 is configured to generate view layer code of the mini program according to the basic UI control on the program interface of the mini program; generate logic layer code of the mini program according to the data source bound with the basic UI control on the program interface of the mini program; and generate a program package of the mini program according to the view layer code and the logic layer code.

In one implementation, the mini program production interface further includes a preview control; and
the receiving module 2120 is configured to push, in response to receiving a preview operation on the preview control, the program package of the mini program to the host application program for running and/or previewing.

In one implementation, the mini program production interface further includes a submitting control; and
the receiving module 2120 is configured to transmit, in response to receiving a submitting operation on the submitting control, the program package of the mini program to a program platform of the host application program for auditing or publishing.

In conclusion, according to the mini program data binding apparatus provided in this embodiment, an operation is performed on a mini program production interface of a visualization production program, a target basic UI control of the mini program is bound with a data source, and the target basic UI control undergone binding can display content corresponding to the data source. Therefore, a user may implement a function of editing or modifying displayed content in the target basic UI control by changing the data source bound with the target basic UI control, or unbinding a binding relationship between the target basic UI control and the data source, without writing code, thereby improving efficiency of a user for producing a mini program. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 22:
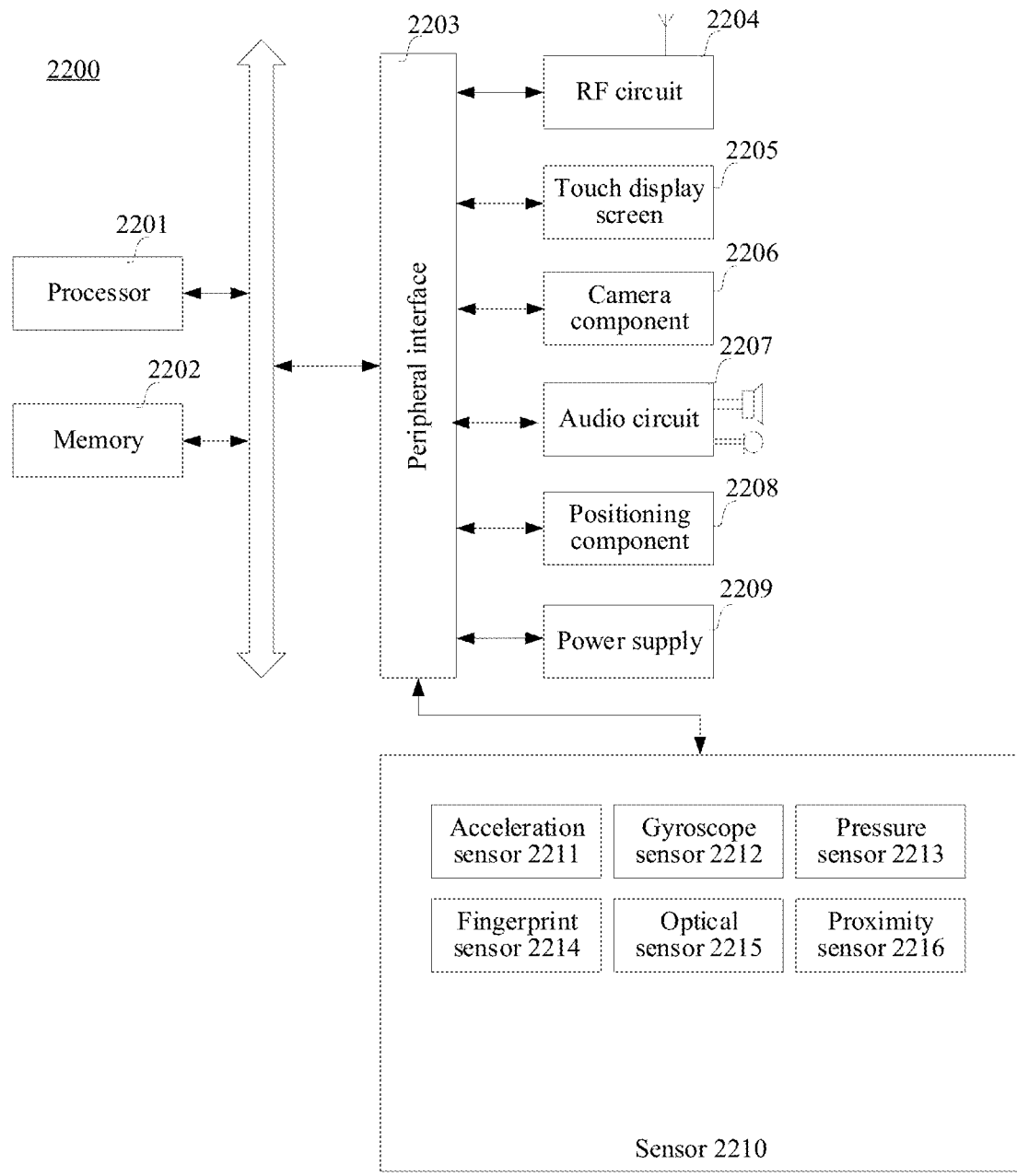
FIG. 22 is a schematic structural diagram of a computer device according to an exemplary embodiment of this application.

A computer device used in this application is described in the following. FIG. 22 is a structural block diagram of a computer device 2200 according to an exemplary embodiment of this application. The computer device 2200 may be a portable mobile terminal, for example, a smartphone, a tablet computer, a moving picture experts group audio layer III (MP3) player, or a moving picture experts group audio layer IV (MP4) player. The computer device 2200 may be further referred to as other names such as user equipment and a portable terminal.

Generally, the computer device 2200 includes a processor 2201 and a memory 2202.

The processor 2201 may include one or more processing cores. For example, the processor may be a 4-core processor or an 8-core processor. The processor 2201 may be implemented in at least one hardware form of digital signal processor (DSP), a field-programmable gate array (FPGA), and a programmable logic array (PLA). The processor 2201 may alternatively include a main processor and a coprocessor. The main processor is configured to process data in an active state, also referred to as a central processing unit (CPU). The coprocessor is a low-power processor configured to process data in a standby state. In some embodiments, the processor 2201 may be integrated with a graphics processing unit (GPU). The GPU is configured to render and draw content that needs to be displayed on a display screen. In some embodiments, the processor 2201 may further include an artificial intelligence (AI) processor. The AI processor is configured to process a computing operation related to machine learning.

The memory 2202 may include one or more computer-readable storage media. The computer-readable storage medium may be tangible and non-transient. The memory 2202 may further include a high-speed random access memory (RAM), and a non-volatile memory such as one or more magnetic disk storage devices and a flash storage device. In some embodiments, a non-transitory computer-readable storage medium in the memory 2202 is configured to store at least one instruction, the at least one instruction being configured to be executed by the processor 2201 to implement the mini program data binding method provided in this application.

In some embodiments, the computer device 2200 may include: a peripheral interface 2203 and at least one peripheral. Specifically, the peripheral includes: at least one of a radio frequency (RF) circuit 2204, a touch display screen 2205, a camera component 2206, an audio circuit 2207, a positioning component 2208, and a power supply 2209.

The peripheral interface 2203 may be configured to connect the at least one peripheral related to input/output (I/O) to the processor 2201 and the memory 2202. In some embodiments, the processor 2201, the memory 2202, and the peripheral interface 2203 are integrated on the same chip or the same circuit board. In some other embodiments, any or both of the processor 2201, the memory 2202, and the peripheral interface 2203 may be implemented on an independent chip or circuit board. This is not limited in this embodiment.

The RF circuit 2204 is configured to receive and transmit an RF signal, which is also referred to as an electromagnetic signal. The RF circuit 2204 communicates with a communication network and another communication device by using the electromagnetic signal. The RF circuit 2204 converts an electric signal into an electromagnetic signal for transmission, or converts a received electromagnetic signal into an electric signal. In some embodiments, the RF circuit 2204 includes: an antenna system, an RF transceiver, one or more amplifiers, a tuner, an oscillator, a digital signal processor, a codec chip set, a subscriber identity module card, and the like. The RF circuit 2204 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF circuit 2204 may further include a circuit related to near field communication (NFC), which is not limited in this application.

The touch display screen 2205 is configured to display a UI. The UI may include a graph, text, an icon, a video, and any combination thereof. The touch display screen 2205 also has a capability of collecting a touch signal on or above a surface of the touch display screen 2205. The touch signal may be used as a control signal to be inputted to the processor 2201 for processing. The touch display screen 2205 is configured to provide a virtual button and/or a virtual keyboard, which is also referred to as a soft button and/or a soft keyboard. In some embodiments, there may be one touch display screen 2205, disposed on a front panel of the computer device 2200. In some other embodiments, there may be at least two touch display screens 2205, disposed on different surfaces of the computer device 2200 respectively or in a folded design. In some embodiments, the touch display screen 2205 may be a flexible display screen, disposed on a curved surface or a folded surface of the computer device 2200. Even, the touch display screen 2205 may be further set in a non-rectangular irregular pattern, namely, a special-shaped screen. The touch display screen 2205 may be made of a material such as a liquid crystal display (LCD) or an organic light-emitting diode (OLED).

The camera component 2206 is configured to capture images or videos. In some embodiments, the camera component 2206 includes a front-facing camera and a rear-facing camera. Generally, the front-facing camera is configured to implement a video call or self-portrait. The rear-facing camera is configured to capture a picture or a video. In some embodiments, there are at least two rear-facing cameras, each of which is any one of a main camera, a depth of field camera and a wide-angle camera, to implement a background blurring function by fusing the main camera and the depth of field camera, and panoramic shooting and virtual reality (VR) shooting functions by fusing the main camera and the wide-angle camera. In some embodiments, the camera component 2206 may further include a flashlight. The flashlight may be a monochrome temperature flashlight, or may be a double color temperature flashlight. The double color temperature flash refers to a combination of a warm light flash and a cold light flash, and may be used for light compensation under different color temperatures.

The audio circuit 2207 is configured to provide an audio interface between a user and the computer device 2200. The audio circuit 2207 may include a microphone and a speaker. The microphone is configured to collect sound waves of users and surroundings, and convert the sound waves into electrical signals and input the signals to the processor 2201 for processing, or input the signals into the RF circuit 2204 to implement voice communication. For the purpose of stereo sound collection or noise reduction, there may be a plurality of microphones, respectively disposed at different parts of the computer device 2200. The microphone may be further a microphone array or an omnidirectional acquisition microphone. The speaker is configured to convert electric signals from the processor 2201 or the RF circuit 2204 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 2207 may also include an earphone jack.

The positioning component 2208 is configured to determine a current geographic location of the computer device 2200 through positioning, to implement navigation or a location based service (LBS). The positioning component 2208 may be a positioning assembly based on the Global Positioning System (GPS) of the United States, the China's Beidou Navigation Satellite System (BDS), the GLONASS System of Russia, or the GALILEO System of the European Union.

The power supply 2209 is configured to supply power to components in the computer device 2200. The power supply 2209 may be an alternating-current power supply, a direct-current power supply, a disposable battery, or a rechargeable battery. When the power supply 2209 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the computer device 2200 may also include one or more sensors 2210. The one or more sensors 2210 include, but are not limited to, an acceleration sensor 2211, a gyroscope sensor 2212, a pressure sensor 2213, a fingerprint sensor 2214, an optical sensor 2215, and a proximity sensor 2216.

The acceleration sensor 2211 may detect accelerations on three coordinate axes of a coordinate system established by the computer device 2200. For example, the acceleration sensor 2211 may be configured to detect components of gravity acceleration on the three coordinate axes. The processor 2201 may control, according to a gravity acceleration signal collected by the acceleration sensor 2211, the touch display screen 2205 to display the UI in a landscape view or a portrait view. The acceleration sensor 2211 may be further configured to collect motion data of a game or a user.

The gyroscope sensor 2212 may detect a body direction and a rotation angle of the computer device 2200. The gyroscope sensor 2212 may cooperate with the acceleration sensor 2211 to collect a 3D action by the user on the computer device 2200. The processor 2201 may implement the following functions according to the data collected by the gyroscope sensor 2212: motion sensing (such as changing the UI according to a tilt operation of the user), image stabilization during shooting, game control, and inertial navigation.

The pressure sensor 2213 may be disposed on a side frame of the computer device 2200 and/or a lower layer of the touch display screen 2205. When the pressure sensor 2213 is disposed at the side frame of the computer device 2200, a holding signal of the user on the computer device 2200 may be detected, and left/right hand identification and a quick action may be performed according to the holding signal. When the pressure sensor 2213 is disposed at the lower layer of the touch display screen 2205, an operable control on the UI interface can be controlled according to a pressure operation of the user on the touch display screen 2205. The operable control includes at least one of a button control, a scroll-bar control, an icon control, and a menu control.

The fingerprint sensor 2214 is configured to acquire a user's fingerprint to identify a user's identity according to the acquired fingerprint. When identifying that the identity of the user is a trusted identity, the processor 2201 authorizes the user to perform related sensitive operations. The sensitive operations include: unlocking a screen, viewing encryption information, downloading software, paying and changing a setting, and the like. The fingerprint sensor 2214 may be disposed on a front face, a back face, or a side face of the computer device 2200. When a physical button or a vendor logo is disposed on the computer device 2200, the fingerprint sensor 2214 may be integrated together with the physical button or the vendor logo.

The optical sensor 2215 is configured to collect ambient light intensity. In an embodiment, the processor 2201 may control display luminance of the touch display screen 2205 according to the ambient light intensity collected by the optical sensor 2215. Specifically, in a case that the ambient light intensity is relatively high, the display luminance of the touch display screen 2205 is increased. In a case that the ambient light intensity is relatively low, the display luminance of the touch display screen 2205 is reduced. In another embodiment, the processor 2201 may further dynamically adjust a camera parameter of the camera component 2206 according to the ambient light intensity collected by the optical sensor 2215.

The proximity sensor 2216, also referred to as a distance sensor, is usually disposed on the front panel of the computer device 2200. The proximity sensor 2216 is configured to collect a distance between a front face of the user and the front face of the computer device 2200. In an embodiment, when the proximity sensor 2216 detects that the distance between the user and the front surface of the computer device 2200 gradually becomes small, the touch display screen 2205 is controlled by the processor 2201 to switch from a screen-on state to a screen-off state. When the proximity sensor 2216 detects that the distance between the user and the front surface of the computer device 2200 gradually becomes large, the touch display screen 2205 is controlled by the processor 2201 to switch from the screen-off state to the screen-on state.

A person skilled in the art may understand that the structure shown in FIG. 21 does not constitute any limitation on the computer device 2100, and the computer device may include more components or fewer components than those shown in the figure, or some components may be combined, or a different component deployment may be used.

This application further provides a computer device including a processor and a memory, the memory storing at least one instruction, at least one segment of program, a code set, or an instruction set, the at least one instruction, the at least one segment of program, the code set, or the instruction set being loaded and executed by the processor to implement the mini program data binding method provided in the foregoing method embodiments.

This application further provides a computer-readable storage medium, storing at least one instruction, at least one program, a code set, or an instruction set, the at least one instruction, the at least one program, the code set, or the instruction set being loaded and executed by a processor to implement the mini program data binding method provided in the foregoing method embodiments.

This application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the mini program data binding method provided in optional implementations of the foregoing aspect.

"Plurality of" mentioned in this specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely illustrative embodiments of this application, but are not intended to limit this application. Any modification, equivalent replacement, or improvement made within the spirit and principle of this application shall fall within the protection scope of this application.

What is claimed is:

1. A mini program data binding method performed at a terminal, the mini program being a program executed in a host application program, and the method comprising:

displaying a mini program production interface of a visualization production program including a panel region and an editing region, the panel region being provided with n types of basic user interface (UI) controls, n being a positive integer;

in response to a user selection of a basic UI control from the n types of basic UI controls, generating a program interface of the mini program in the editing region according to the selected basic UI control, the program interface including a plurality of control components displayed in a first layout and a binding panel;

obtaining a dataset comprising a plurality of fields;

in response to a user selection of the dataset:

while displaying the plurality of control components in the first layout, displaying data from the plurality of fields in a first arrangement order for binding the plurality of fields to the plurality of control components; and presenting, within the binding panel, a binding control element, wherein activation of the binding control element changes the first arrangement order;

in response to detecting a user activation of the binding control element, displaying data from the plurality of fields in a second arrangement order for binding the plurality of fields to the plurality of control components while continuing to display the plurality of control components in the first layout, wherein the second arrangement order is different from the first arrangement order;

in response to a user confirmation operation, binding the plurality of fields to respective control components of the plurality of control components in accordance with the second arrangement order, wherein each field is used for displaying the respective control component; and in response to receiving a preview operation, transmitting a program package of the mini program to the host application program for running and/or previewing.

2. The method according to claim 1, wherein the plurality of control components comprises m control components, and the plurality of fields comprises m data fields, m being a positive integer greater than 1, and wherein the first arrangement order comprises an $i^{th}$ arrangement order; and wherein the second arrangement order is an $(i+1)^{th}$ arrangement order, the $(i+1)^{th}$ arrangement order being an arrangement order different from the $i^{th}$ arrangement order, i being a positive integer with an initial value being 1.

3. The method according to claim 2, wherein the method further comprises:

generating all arrangement orders of the m data fields; and wherein displaying the data from the plurality of fields in the second arrangement order comprises:

randomly identifying, in response to detecting the user activation of the binding control element, the second arrangement order, different from the $i^{th}$ arrangement order, from all the arrangement orders as the $(i+1)^{th}$ arrangement order.

4. The method according to claim 3, wherein displaying the data from the plurality of fields in the second arrangement order comprises:

reading a $j^{th}$ data field and a field type thereof from the m data fields according to the $(i+1)^{th}$ arrangement order, $1 \leq j \leq m$, and j being a positive integer;

determining a target control component satisfying a binding condition from the m control components, the binding condition comprising that:

the control component is not yet bound with a data field;

the control component matches the field type of the $j^{th}$ data field; or the control component is not yet bound with a data field and matches the field type of the $j^{th}$ data field;

binding the target control component with the $j^{th}$ data field.

5. The method according to claim 2, wherein the method further comprises:

receiving a binding modification operation on a target control component;

displaying at least one candidate data field corresponding to the target control component, the candidate data field being a data field, whose field type matches the target control component, in the m data fields; and binding, in response to receiving a selection operation, a data field selected from the at least one candidate data field with the target control component.

6. The method according to claim 1, wherein the obtaining the dataset comprises one of:

displaying a first table file and receiving an addition operation, the addition operation being used for adding the first table file to the visualization production program;

receiving a program calling operation, the program calling operation being used for calling a table application in the visualization production program, the table application comprising a second table file; and receiving a third table file by using a short range wireless communication technology.

7. The method according to claim 1, wherein the method further comprises:

generating view layer code of the mini program according to the selected basic UI control on the program interface of the mini program;

generating logic layer code of the mini program according to the dataset bound with the selected basic UI control on the program interface of the mini program; and generating the program package of the mini program according to the view layer code and the logic layer code.

8. The method according to claim 1, wherein the mini program production interface further comprises a submitting control; and the method further comprises:

transmitting, in response to receiving a submitting operation on the submitting control, the program package of the mini program to a program platform of the host application program for auditing or publishing.

9. The method according to claim 1, wherein the first arrangement order is preset by the visualization production program based on a historical binding relationship record of the user.

10. The method according to claim 1, further comprising:

after displaying data from the plurality of fields in the second arrangement order, receiving a user input at a control component of the plurality of control components; and in response to the user input, presenting a plurality of selectable candidate fields for binding to the control component.

11. A computer device, comprising a processor and a memory, the memory storing at least one instruction, the at least one instruction being loaded and executed by the processor to perform a plurality of operations for binding mini program data, the plurality of operations including:

displaying a mini program production interface of a visualization production program including a panel region and an editing region, the panel region being provided with n types of basic user interface (UI) controls, n being a positive integer;

in response to a user selection of a basic UI control from the n types of basic UI controls, generating a program interface of the mini program in the editing region according to the selected basic UI control, the program interface including a plurality of control components displayed in a first layout and a binding panel;

obtaining a dataset comprising a plurality of fields;

in response to a user selection of the dataset:

while displaying the plurality of control components in the first layout, displaying data from the plurality of fields in a first arrangement order for binding the plurality of fields to the plurality of control components; and presenting, within the binding panel, a binding control element, wherein activation of the binding control element changes the first arrangement order;

in response to detecting a user activation of the binding control element, displaying data from the plurality of fields in a second arrangement order for binding the plurality of fields to the plurality of control components while continuing to display the plurality of control components in the first layout, wherein the second arrangement order is different from the first arrangement order;

in response to a user confirmation operation, binding the plurality of fields to respective control components of the plurality of control components in accordance with the second arrangement order, wherein each field is used for displaying the respective control component; and in response to receiving a preview operation, transmitting a program package of the mini program to a host application program for running and/or previewing.

12. The computer device according to claim 11, wherein the plurality of control components comprises m control components, and the plurality of fields comprises m data fields, m being a positive integer greater than 1, and wherein the first arrangement order comprises an $i^{th}$ arrangement order; and wherein the second arrangement order is an $(i+1)^{th}$ arrangement order, the $(i+1)^{th}$ arrangement order being an arrangement order different from the $i^{th}$ arrangement order, i being a positive integer with an initial value being 1.

13. The computer device according to claim 12, wherein the plurality of operations further comprise:

generating all arrangement orders of the m data fields; and wherein displaying the data from the plurality of fields in the second arrangement order comprises:

randomly identifying, in response to detecting the user activation of the binding control element, the second arrangement order, different from the $i^{th}$ arrangement order, from all the arrangement orders as the $(i+1)^{th}$ arrangement order.

14. The computer device according to claim 13, wherein displaying the data from the plurality of fields in the second arrangement order comprises:

reading a $j^{th}$ data field and a field type thereof from the m data fields according to the $(i+1)^{th}$ arrangement order, $1 \leq j \leq m$, and j being a positive integer;

determining a target control component satisfying a binding condition from the m control components, the binding condition comprising that: the control component is not yet bound with a data field; the control component matches the field type of the $j^{th}$ data field; or the control component is not yet bound with a data field and matches the field type of the $j^{th}$ data field;

binding the target control component with the $j^{th}$ data field.

15. The computer device according to claim 12, wherein the plurality of operations further comprise:

receiving a binding modification operation on a target control component;

displaying at least one candidate data field corresponding to the target control component, the candidate data field being a data field, whose field type matches the target control component, in the m data fields; and binding, in response to receiving a selection operation, a data field selected from the at least one candidate data field with the target control component.

16. The computer device according to claim 11, wherein the obtaining the dataset comprises one of:

displaying a first table file and receiving an addition operation, the addition operation being used for adding the first table file to the visualization production program;

receiving a program calling operation, the program calling operation being used for calling a table application in the visualization production program, the table application comprising a second table file; and receiving a third table file by using a short range wireless communication technology.

17. The computer device according to claim 11, wherein the plurality of operations further comprise:

generating view layer code of the mini program according to the selected basic UI control on the program interface of the mini program;

generating logic layer code of the mini program according to the dataset bound with the selected basic UI control on the program interface of the mini program; and generating the program package of the mini program according to the view layer code and the logic layer code.

18. A non-transitory computer-readable storage medium, storing at least one instruction, the at least one instruction being loaded and executed by a processor of a computer device to perform a plurality of operations for binding mini program data, the plurality of operations including:

displaying a mini program production interface of a visualization production program including a panel region and an editing region, the panel region being provided with n types of basic user interface (UI) controls, n being a positive integer;

in response to a user selection of a basic UI control from the n types of basic UI controls, generating a program interface of the mini program in the editing region according to the selected basic UI control, the program interface including a plurality of control components displayed in a first layout and a binding panel;

obtaining a dataset comprising a plurality of fields;

in response to a user selection of the dataset:

while displaying the plurality of control components in the first layout, displaying data from the plurality of fields in a first arrangement order for binding the plurality of fields to the plurality of control components; and presenting, within the binding panel, a binding control element, wherein activation of the binding control element changes the first arrangement order;

in response to detecting a user activation of the binding control element, displaying data from the plurality of fields in a second arrangement order for binding the plurality of fields to the plurality of control components while continuing to display the plurality of control components in the first layout, wherein the second arrangement order is different from the first arrangement order;

in response to a user confirmation operation, binding the plurality of fields to respective control components of the plurality of control components in accordance with the second arrangement order, wherein each field is used for displaying the respective control component; and in response to receiving a preview operation, transmitting a program package of the mini program to a host application program for running and/or previewing.

19. The non-transitory computer-readable storage medium according to claim 18, wherein the plurality of control components comprises m control components, and the plurality of fields comprises m data fields, m being a positive integer greater than 1, and wherein the first arrangement order comprises an $i^{th}$ arrangement order; and wherein the second arrangement order is an $(i+1)^{th}$ arrangement order, the $(i+1)^{th}$ arrangement order being an arrangement order different from the $i^{th}$ arrangement order, i being a positive integer with an initial value being 1.

20. The non-transitory computer-readable storage medium according to claim 18, wherein the plurality of operations further comprise:

generating view layer code of the mini program according to the selected basic UI control on the program interface of the mini program;

generating logic layer code of the mini program according to the dataset bound with the selected basic UI control on the program interface of the mini program; and generating the program package of the mini program according to the view layer code and the logic layer code.

* * * * *